(12) United States Patent　　(10) Patent No.: US 9,166,834 B2
　　Eliaz　　　　　　　　　　　　　(45) Date of Patent: Oct. 20, 2015

(54) METHOD AND SYSTEM FOR CORRUPT SYMBOL HANDLING FOR PROVIDING HIGH RELIABILITY SEQUENCES

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/064,334

(22) Filed: Oct. 28, 2013

(65) Prior Publication Data

US 2014/0140446 A1　　May 22, 2014

Related U.S. Application Data

(63) Continuation of application No. 13/755,054, filed on Jan. 31, 2013, now Pat. No. 8,571,146.

(60) Provisional application No. 61/726,099, filed on Nov. 14, 2012, provisional application No. 61/729,774, filed on Nov. 26, 2012, provisional application No. 61/747,132, filed on Dec. 28, 2012, provisional application No. 61/662,085, filed on Jun. 20, 2012.

(51) Int. Cl.
　　*H04L 1/20*　　　(2006.01)
　　*H04B 1/16*　　　(2006.01)
　　(Continued)

(52) U.S. Cl.
　　CPC .......... *H04L 25/0328* (2013.01); *H04B 1/0475* (2013.01); *H04B 1/16* (2013.01); *H04L 1/206* (2013.01); *H04L 25/03197* (2013.01);
　　(Continued)

(58) Field of Classification Search
　　CPC ................... H04L 25/03178; H04L 25/03197; H04L 1/0045; H04L 1/20; H04L 7/0062; H03M 13/154; H03M 13/293; H03M 13/373; H03M 13/455; H04B 17/0042
　　See application file for complete search history.

(56) References Cited

U.S. PATENT DOCUMENTS 4,109,101 A　　8/1978　Mitani
4,135,057 A　　1/1979　Bayless, Sr. et al.
(Continued)

OTHER PUBLICATIONS

Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).

(Continued)

*Primary Examiner* — Aristocratis Fotakis
(74) *Attorney, Agent, or Firm* — McAndrews, Held & Malloy, Ltd.

(57) ABSTRACT

For corrupt symbol handling for providing high reliability sequences, an inter-symbol correlated (ISC) signal is received. During sequence estimation when demodulating the received ISC signal, partial response samples in the ISC may be processed utilizing an erasure mechanism. The partial response samples are spread (e.g. interleaved) over time during modulation by a modulator. A determination is made as to whether to utilize self erasure or external erasure to process the spread partial response samples. The determination may be based on whether or not events of low SNR for corresponding ones of the partial response samples are identified. The external erasure may be utilized for processing the corresponding ones of the partial response samples when the events of low SNR are identified and the self erasure is utilized when the events of low SNR are not identifiable. Erasure results maybe fed back to the modulator.

14 Claims, 19 Drawing Sheets

(51) Int. Cl.
*H04L 25/03* (2006.01)
*H04B 1/04* (2006.01)
*H04L 27/34* (2006.01)
*H04L 27/38* (2006.01)

(52) U.S. Cl.
CPC .... *H04L25/03834* (2013.01); *H04L 25/03949* (2013.01); *H04L 27/3405* (2013.01); *H04L 27/38* (2013.01)

(56) References Cited

U.S. PATENT DOCUMENTS

| | | | |
|---|---|---|---|
| 4,653,052 A * | 3/1987 | Doi et al. | 714/755 |
| 4,797,925 A | 1/1989 | Lin | |
| 5,111,484 A | 5/1992 | Karabinis | |
| 5,131,011 A | 7/1992 | Bergmans et al. | |
| 5,202,903 A | 4/1993 | Okanoue | |
| 5,249,200 A | 9/1993 | Chen et al. | |
| 5,283,813 A | 2/1994 | Shalvi et al. | |
| 5,291,516 A | 3/1994 | Dixon et al. | |
| 5,394,439 A | 2/1995 | Hemmati | |
| 5,432,822 A * | 7/1995 | Kaewell, Jr. | 375/340 |
| 5,459,762 A | 10/1995 | Wang et al. | |
| 5,590,121 A | 12/1996 | Geigel et al. | |
| 5,602,507 A | 2/1997 | Suzuki | |
| 5,757,855 A | 5/1998 | Strolle et al. | |
| 5,784,415 A | 7/1998 | Chevillat et al. | |
| 5,818,653 A | 10/1998 | Park et al. | |
| 5,886,748 A | 3/1999 | Lee | |
| 5,889,823 A | 3/1999 | Agazzi et al. | |
| 5,915,213 A | 6/1999 | Iwatsuki et al. | |
| 5,930,309 A | 7/1999 | Knutson et al. | |
| 6,009,120 A | 12/1999 | Nobakht | |
| 6,167,079 A | 12/2000 | Kinnunen et al. | |
| 6,233,709 B1 | 5/2001 | Zhang et al. | |
| 6,272,173 B1 | 8/2001 | Hatamian | |
| 6,335,954 B1 | 1/2002 | Bottomley et al. | |
| 6,516,437 B1 | 2/2003 | Van Stralen et al. | |
| 6,532,256 B2 | 3/2003 | Miller | |
| 6,535,549 B1 | 3/2003 | Scott et al. | |
| 6,697,441 B1 | 2/2004 | Bottomley et al. | |
| 6,785,342 B1 | 8/2004 | Isaksen et al. | |
| 6,871,208 B1 | 3/2005 | Guo et al. | |
| 6,968,021 B1 | 11/2005 | White et al. | |
| 6,985,709 B2 | 1/2006 | Perets | |
| 7,158,324 B2 | 1/2007 | Stein et al. | |
| 7,190,288 B2 | 3/2007 | Robinson et al. | |
| 7,205,798 B1 | 4/2007 | Agarwal et al. | |
| 7,206,363 B2 | 4/2007 | Hegde et al. | |
| 7,215,716 B1 | 5/2007 | Smith | |
| 7,467,338 B2 | 12/2008 | Saul | |
| 7,830,854 B1 | 11/2010 | Sarkar et al. | |
| 7,974,230 B1 | 7/2011 | Talley et al. | |
| 8,005,170 B2 | 8/2011 | Lee et al. | |
| 8,059,737 B2 | 11/2011 | Yang | |
| 8,175,186 B1 | 5/2012 | Wiss et al. | |
| 8,199,804 B1 | 6/2012 | Cheong | |
| 8,248,975 B2 | 8/2012 | Fujita et al. | |
| 8,351,536 B2 | 1/2013 | Mazet et al. | |
| 8,422,589 B2 | 4/2013 | Golitschek Edler Von Elbwart et al. | |
| 8,526,523 B1 | 9/2013 | Eliaz | |
| 8,548,072 B1 | 10/2013 | Eliaz | |
| 8,548,089 B2 | 10/2013 | Agazzi et al. | |
| 8,548,097 B1 | 10/2013 | Eliaz | |
| 8,553,821 B1 | 10/2013 | Eliaz | |
| 8,559,494 B1 | 10/2013 | Eliaz | |
| 8,559,496 B1 | 10/2013 | Eliaz | |
| 8,559,498 B1 | 10/2013 | Eliaz | |
| 8,565,363 B1 | 10/2013 | Eliaz | |
| 8,566,687 B1 | 10/2013 | Eliaz | |
| 8,571,131 B1 | 10/2013 | Eliaz | |
| 8,571,146 B1 | 10/2013 | Eliaz | |
| 8,572,458 B1 | 10/2013 | Eliaz | |
| 8,582,637 B1 | 11/2013 | Eliaz | |
| 8,599,914 B1 | 12/2013 | Eliaz | |
| 8,605,832 B1 | 12/2013 | Eliaz | |
| 8,665,941 B1 | 3/2014 | Eliaz | |
| 8,665,992 B1 | 3/2014 | Eliaz | |
| 8,666,000 B2 | 3/2014 | Eliaz | |
| 8,675,769 B1 | 3/2014 | Eliaz | |
| 8,675,782 B2 | 3/2014 | Eliaz | |
| 8,681,889 B2 | 3/2014 | Eliaz et al. | |
| 8,744,003 B2 | 6/2014 | Eliaz | |
| 2001/0008542 A1 | 7/2001 | Wiebke et al. | |
| 2002/0016938 A1 | 2/2002 | Starr | |
| 2002/0123318 A1 | 9/2002 | Lagarrigue | |
| 2002/0150065 A1 | 10/2002 | Ponnekanti | |
| 2002/0150184 A1 | 10/2002 | Hafeez et al. | |
| 2002/0172297 A1 | 11/2002 | Ouchi et al. | |
| 2002/0186753 A1 * | 12/2002 | Kolze | 375/147 |
| 2003/0016741 A1 | 1/2003 | Sasson et al. | |
| 2003/0135809 A1 | 7/2003 | Kim | |
| 2003/0210352 A1 | 11/2003 | Fitzsimmons et al. | |
| 2004/0037374 A1 | 2/2004 | Gonikberg | |
| 2004/0086276 A1 | 5/2004 | Lenosky et al. | |
| 2004/0120409 A1 | 6/2004 | Yasotharan et al. | |
| 2004/0142666 A1 | 7/2004 | Creigh et al. | |
| 2004/0170228 A1 | 9/2004 | Vadde | |
| 2004/0174937 A1 | 9/2004 | Ungerboeck | |
| 2004/0227570 A1 | 11/2004 | Jackson et al. | |
| 2004/0240578 A1 | 12/2004 | Thesling | |
| 2004/0257955 A1 | 12/2004 | Yamanaka et al. | |
| 2005/0047517 A1 | 3/2005 | Georgios et al. | |
| 2005/0123077 A1 | 6/2005 | Kim | |
| 2005/0135472 A1 | 6/2005 | Higashino | |
| 2005/0220218 A1 | 10/2005 | Jensen et al. | |
| 2005/0265470 A1 | 12/2005 | Kishigami et al. | |
| 2005/0276317 A1 | 12/2005 | Jeong et al. | |
| 2005/0283715 A1 * | 12/2005 | Sutivong et al. | 714/790 |
| 2006/0067396 A1 | 3/2006 | Christensen | |
| 2006/0109780 A1 | 5/2006 | Fechtel | |
| 2006/0171489 A1 | 8/2006 | Ghosh et al. | |
| 2006/0239339 A1 | 10/2006 | Brown et al. | |
| 2006/0245765 A1 | 11/2006 | Elahmadi et al. | |
| 2006/0280113 A1 | 12/2006 | Huo | |
| 2007/0015529 A1 * | 1/2007 | Choi et al. | 455/522 |
| 2007/0016839 A1 * | 1/2007 | Chiou | 714/774 |
| 2007/0092017 A1 | 4/2007 | Abedi | |
| 2007/0098090 A1 | 5/2007 | Ma et al. | |
| 2007/0098116 A1 | 5/2007 | Kim et al. | |
| 2007/0110177 A1 | 5/2007 | Molander et al. | |
| 2007/0110191 A1 | 5/2007 | Kim et al. | |
| 2007/0127608 A1 | 6/2007 | Scheim et al. | |
| 2007/0140330 A1 | 6/2007 | Allpress et al. | |
| 2007/0189404 A1 | 8/2007 | Baum et al. | |
| 2007/0213087 A1 | 9/2007 | Laroia et al. | |
| 2007/0218936 A1 * | 9/2007 | Waxman et al. | 455/522 |
| 2007/0230593 A1 | 10/2007 | Eliaz et al. | |
| 2007/0258517 A1 | 11/2007 | Rollings et al. | |
| 2007/0291719 A1 | 12/2007 | Demirhan et al. | |
| 2008/0002789 A1 | 1/2008 | Jao et al. | |
| 2008/0049598 A1 | 2/2008 | Ma et al. | |
| 2008/0080644 A1 | 4/2008 | Batruni | |
| 2008/0130716 A1 | 6/2008 | Cho et al. | |
| 2008/0130788 A1 | 6/2008 | Copeland | |
| 2008/0159377 A1 | 7/2008 | Allpress et al. | |
| 2008/0207143 A1 | 8/2008 | Skarby et al. | |
| 2008/0260985 A1 | 10/2008 | Shirai et al. | |
| 2009/0003425 A1 | 1/2009 | Shen et al. | |
| 2009/0028234 A1 | 1/2009 | Zhu | |
| 2009/0070658 A1 * | 3/2009 | Patapoutian et al. | 714/795 |
| 2009/0075590 A1 | 3/2009 | Sahinoglu et al. | |
| 2009/0086808 A1 | 4/2009 | Liu et al. | |
| 2009/0122854 A1 | 5/2009 | Zhu et al. | |
| 2009/0185612 A1 | 7/2009 | McKown | |
| 2009/0213908 A1 | 8/2009 | Bottomley | |
| 2009/0290620 A1 | 11/2009 | Tzannes et al. | |
| 2009/0323841 A1 | 12/2009 | Clerckx et al. | |
| 2010/0002692 A1 | 1/2010 | Bims | |
| 2010/0034253 A1 | 2/2010 | Cohen | |
| 2010/0039100 A1 | 2/2010 | Sun et al. | |
| 2010/0062705 A1 | 3/2010 | Rajkotia et al. | |
| 2010/0074349 A1 | 3/2010 | Hyllander et al. | |

(56) References Cited

U.S. PATENT DOCUMENTS

| | | |
|---|---|---|
| 2010/0166050 A1 | 7/2010 | Aue |
| 2010/0172309 A1 | 7/2010 | Forenza et al. |
| 2010/0202505 A1 | 8/2010 | Yu et al. |
| 2010/0202507 A1 | 8/2010 | Allpress et al. |
| 2010/0208774 A1 | 8/2010 | Guess et al. |
| 2010/0215107 A1 | 8/2010 | Yang |
| 2010/0220825 A1 | 9/2010 | Dubuc et al. |
| 2010/0278288 A1 | 11/2010 | Panicker et al. |
| 2010/0284481 A1 | 11/2010 | Murakami et al. |
| 2010/0309796 A1 | 12/2010 | Khayrallah |
| 2010/0329325 A1 | 12/2010 | Mobin et al. |
| 2011/0051864 A1 | 3/2011 | Chalia et al. |
| 2011/0064171 A1 | 3/2011 | Huang et al. |
| 2011/0074500 A1 | 3/2011 | Bouillet et al. |
| 2011/0074506 A1 | 3/2011 | Kleider et al. |
| 2011/0090986 A1 | 4/2011 | Kwon et al. |
| 2011/0134899 A1 | 6/2011 | Jones, IV et al. |
| 2011/0150064 A1 | 6/2011 | Kim et al. |
| 2011/0164492 A1 | 7/2011 | Ma et al. |
| 2011/0167323 A1* | 7/2011 | Yu et al. ............... 714/795 |
| 2011/0188550 A1 | 8/2011 | Wajcer et al. |
| 2011/0228869 A1 | 9/2011 | Barsoum et al. |
| 2011/0243266 A1 | 10/2011 | Roh |
| 2011/0275338 A1 | 11/2011 | Seshadri et al. |
| 2011/0310823 A1 | 12/2011 | Nam et al. |
| 2011/0310978 A1 | 12/2011 | Wu et al. |
| 2012/0051464 A1 | 3/2012 | Kamuf et al. |
| 2012/0106617 A1 | 5/2012 | Jao et al. |
| 2012/0207248 A1 | 8/2012 | Ahmed et al. |
| 2013/0028299 A1 | 1/2013 | Tsai |
| 2013/0044877 A1 | 2/2013 | Liu et al. |
| 2013/0121257 A1 | 5/2013 | He et al. |

OTHER PUBLICATIONS

Stefano Tomasin, et al. "Iterative Interference Cancellation and Channel Estimation for Mobile OFDM", IEEE Transactions on Wireless Communications, Vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

Int'l Search Report and Written Opinion for PCT/IB2013/01860 dated Mar. 21, 2014.

Int'l Search Report and Written Opinion for PCT/IB2013/01970 dated Mar. 27, 2014.

Int'l Search Report and Written Opinion for PCT/IB2013/01930 dated May 15, 2014.

Int'l Search Report and Written Opinion for PCT/IB2013/02081 dated May 22, 2014.

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686, Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

* cited by examiner

METHOD AND SYSTEM FOR CORRUPT SYMBOL HANDLING FOR PROVIDING HIGH RELIABILITY SEQUENCES

CROSS-REFERENCE TO RELATED APPLICATIONS/INCORPORATION BY REFERENCE

This patent application is a continuation of U.S. patent application Ser. No. 13/755,054 filed on Jan. 31, 2013 (now U.S. Pat. No. 8,571,146), which in turn, claims priority to U.S. Provisional Patent Application Ser. No. 61/662,085 entitled "Apparatus and Method for Efficient Utilization of Bandwidth" and filed on Jun. 20, 2012. This patent application is also a non-provisional of U.S. Provisional Patent Application Ser. No. 61/726,099 entitled "Modulation Scheme Based on Partial Response" and filed on Nov. 14, 2012, U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

This application also makes reference to:
U.S. patent application Ser. No. 13/754,998, titled "Design and Optimization of Partial Response Pulse Shape Filter," and filed on Jan. 31, 2013;
U.S. patent application Ser. No. 13/755,001, titled "Constellation Map Optimization For Highly Spectrally Efficient Communications," and filed on Jan. 31, 2013;
U.S. patent application Ser. No. 13/755,008, titled "Dynamic Filter Adjustment for Highly-Spectrally-Efficient Communications," and filed on Jan. 31, 2013 (now U.S. Pat. No. 8,571,131);
U.S. patent application Ser. No. 13/755,011, titled "Timing Synchronization for Reception of Highly-Spectrally-Efficient Communications," and filed on Jan. 31, 2013 (now U.S. Pat. No. 8,559,494);
U.S. patent application Ser. No. 13/755,018, titled "Feed Forward Equalization for Highly-Spectrally-Efficient Communications," and filed on Jan. 31, 2013 (now U.S. Pat. No. 8,571,131);
U.S. patent application Ser. No. 13/755,021, titled "Decision Feedback Equalizer for Highly-Spectrally-Efficient Communications," and filed on Jan. 31, 2013;
U.S. patent application Ser. No. 13/755,025, titled "Decision Feedback Equalizer with Multiple Cores for Highly-Spectrally-Efficient Communications," and filed on Jan. 31, 2013;
U.S. patent application Ser. No. 13/755,026, titled "Decision Feedback Equalizer Utilizing Symbol Error Rate Biased Adaptation Function for Highly-Spectrally-Efficient Communications," and filed on Jan. 31, 2013 (now U.S. Pat. No. 8,559,498);
U.S. patent application Ser. No. 13/755,028, titled "Coarse Phase Estimation for Highly-Spectrally-Efficient Communications," and filed on Jan. 31, 2013 (now U.S. Pat. No. 8,548,097);
U.S. patent application Ser. No. 13/755,039, titled "Fine Phase Estimation for Highly Spectrally Efficient Communications," and filed on Jan. 31, 2013 (now U.S. Pat. No. 8,565,363);
U.S. patent application Ser. No. 13/755,043, titled "Joint Sequence Estimation of Symbol and Phase with High Tolerance of Nonlinearity," and filed on Jan. 31, 2013 (now U.S. Pat. No. 8,605,832); and
U.S. patent application Ser. No. 13/755,060, titled "Method and System for Forward Error Correction Decoding with Parity Check for Use in Low Complexity Highly-Spectrally Efficient Communications," and filed on Jan. 31, 2013 (now U.S. Pat. No. 8,566,687).

Each of the above referenced application is hereby incorporated herein by reference in its entirety.

FIELD OF THE DISCLOSURE

Certain embodiments of the disclosure relate to communication systems. More specifically, certain embodiments of the disclosure relate to a method and system for corrupt symbol handling for providing high reliability sequences.

BACKGROUND

Existing communications methods and systems are overly power hungry and/or spectrally inefficient.

Further limitations and disadvantages of conventional and traditional approaches will become apparent to one of skill in the art, through comparison of such systems with some aspects of the present disclosure as set forth in the remainder of the present application with reference to the drawings

BRIEF SUMMARY

Methods and systems are provided for corrupt symbol handling for providing high reliability sequences, substantially as illustrated by and/or described in connection with at least one of the figures, as set forth more completely in the claims.

DETAILED DESCRIPTION

Certain embodiments of the disclosure may be found in a method and system for corrupt symbol handling for providing high reliability sequences. In various embodiments of the disclosure, an inter-symbol correlated (ISC) signal is received. During sequence estimation when demodulating the received an inter-symbol correlated signal, partial response samples in the received an inter-symbol correlated signal may be processed utilizing an erasure mechanism. The partial response samples may be spread over time by, for example, interleaving. Results corresponding to the erasure mechanism may be fed back to a modulator that transmitted the inter-symbol correlated signal. The modulator may adjust operation of one or more of its functions and/or components based on the feedback results. The receiver may be determined whether to utilize self erasure or external erasure for the processing of the spread partial response samples. In this regard, the determining may be based on whether or not events of low SNR for corresponding ones of the partial response samples are identified, and/or when user configuration for concurrent operation of self erasure and external erasure occurs.

The external erasure may be utilized for processing the corresponding ones of the partial response samples when the events of low SNR are identified. The self erasure may be utilized for processing the corresponding ones of the partial response samples when the events of low SNR are not identified externally. In this regard, the utilization of the self erasure may be based on one or more branch metrics of the corresponding ones of said partial response samples.

In general, SNR is related to the average signal power and the average noise power. But in the sequel and in the following embodiments, the SNR is related to the sample SNR.

Figure 1:
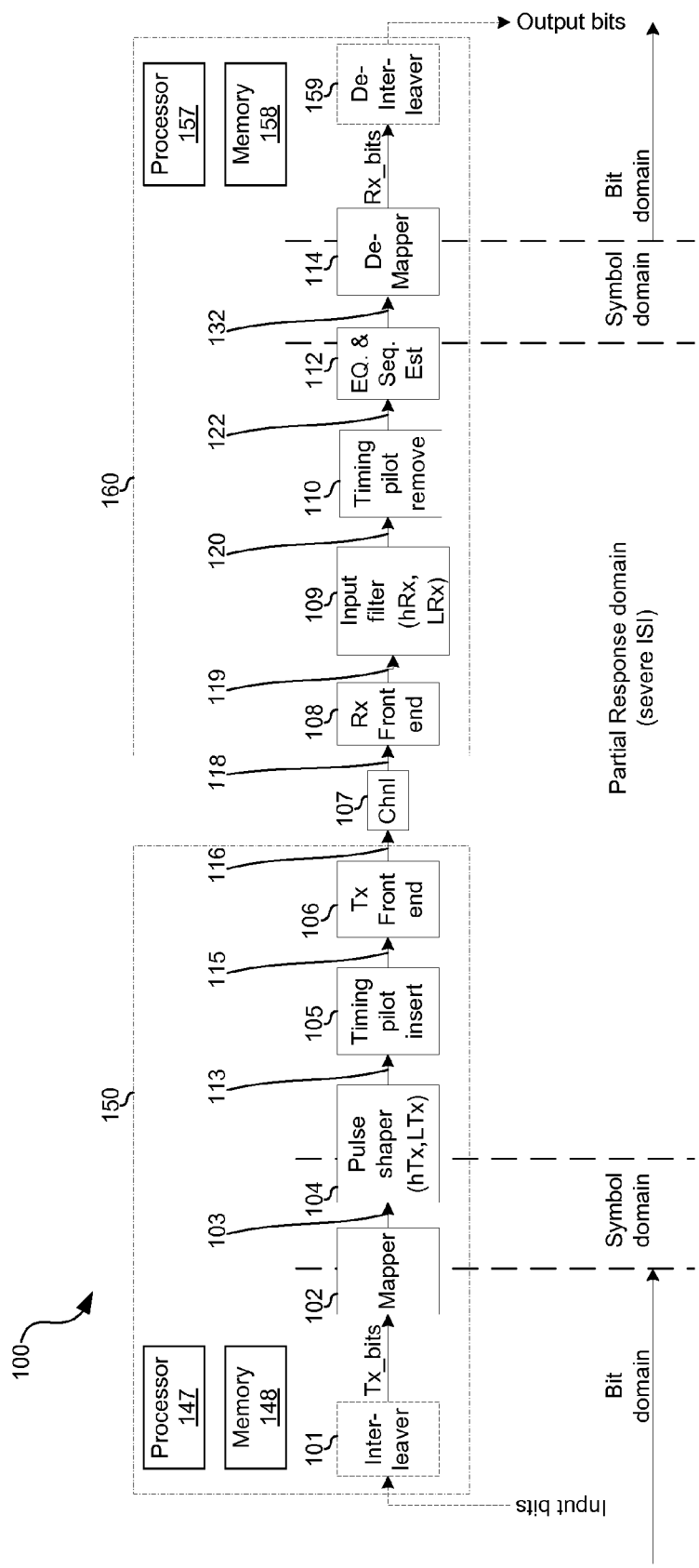
FIG. 1 is a block diagram depicting an example system configured for low-complexity, highly-spectrally-efficient communications, in accordance with an embodiment of the disclosure.

FIG. 1 is a block diagram depicting an example system configured for low-complexity, highly-spectrally-efficient communications, in accordance with an embodiment of the disclosure. Referring to FIG. 1, there is shown a system 100. The system 100 comprises an interleaver circuit 101, a mapper circuit 102, a pulse shaping filter circuit 104, a timing pilot insertion circuit 105, a transmitter front-end circuit 106, a processor 147, memory 148, a channel 107, a receiver front-end 108, a filter circuit 109, a timing pilot removal circuit 110, an equalization and sequence estimation circuit 112, a de-mapping circuit 114, a de-interleaver 159, a processor 157 and memory 158. The components 101, 102, 104, 105, 106, 147 and 148 may be part of a modulator or transmitter 150. In various exemplary embodiments of the disclosure, the modulator or transmitter 150 may comprise a base station or access point, a router, a gateway, a mobile device, a server, a computer, a computer peripheral device, a table, a modem, and/or a set-top box. The components 108, 109, 110, 112, 114, 157, 158 and 159 may be part of a demodulator or receiver 160. In various exemplary embodiments of the disclosure, the demodulator or receiver 160 may comprise a base station or access point, a router, a gateway, a mobile device, a server, a computer, a computer peripheral device, a table, a modem, a and/or a set-top box. A device that comprises the modulator or transmitter 150 and the demodulator or receiver 160 may be referred to as a modem (modulator/demodulator) or a transceiver (transmitter/receiver). The modulator or transmitter 150 and the demodulator or receiver 160 may communicate via the communication medium or channel 107.

The processor 147 may comprise suitable logic, circuitry, interfaces and/or code that may be operable to control configuration, operation and maintenance of the modulator or transmitter 150 and its corresponding components, systems and/or subsystems. For example, the processor 147 may be operable to control configuration and operation of the interleaver circuit 101, the mapper circuit 102, the pulse shaping filter circuit 104, the timing pilot insertion circuit 105, the transmitter front-end circuit 106 and the memory 148.

The memory 148 may comprise suitable logic, circuitry, interfaces and/or code that may be operable to store information and/or data for the modulator or transmitter 150 and it corresponding components, systems and/or subsystems. The memory 148 may comprise volatile and/or non-volatile storage components or elements. The memory 148 may store code, configuration settings and/or operating data for the transmitter 150 and/or one or more of its components in the modulator or transmitter 150, for example, the interleaver circuit 101, the mapper circuit 102, the pulse shaping filter circuit 104, the timing pilot insertion circuit 105, and the transmitter front-end circuit 106, and the processor 147. The memory 148 may also comprise memory mapped I/O components such as registers for the components, systems and/or subsystems in the modulator or transmitter 150.

The processor 157 may comprise suitable logic, circuitry, interfaces and/or code that may be operable to control configuration, operation and maintenance of the demodulator or receiver 160 and its corresponding components, systems and/or subsystems. For example, the processor 157 may be operable to configure and control operation for the memory 158, the receiver front-end 108, the filter circuit 109, the timing pilot removal circuit 110, the equalization and sequence estimation circuit 112, the de-mapping circuit 114, and the de-interleaver 159.

The memory 158 may comprise suitable logic, circuitry, interfaces and/or code that may be operable to store information and/or data for the demodulator or receiver 160 and it corresponding components, systems and/or subsystems. The memory 158 may comprise volatile and/or non-volatile storage components or elements. The memory 158 may store code, configuration settings and/or operating data for the demodulator or receiver 160 and/or one or more of its components in the demodulator or receiver 160, for example, the memory 148, the receiver front-end 108, the filter circuit 109, the timing pilot removal circuit 110, the equalization and sequence estimation circuit 112, the de-mapping circuit 114, the de-interleaver 159, and the processor 157. The memory 158 may also comprise memory mapped I/O components such as registers for the components, systems and/or subsystems in the demodulator or receiver 160.

The interleaver 101 may comprise suitable logic, interfaces, circuitry and/or code that may be operable to interleave the coded bits or codewords and generate and output bitstream, namely Tx_bits. The coded bits or codewords may be generated by a forward error correction (FEC) circuit. In this regard, the interleaver is operable to scramble or spread the coded bits or codewords. This spreading of the codewords distributes the coded bits or codewords to, for example, mitigate the effect of burst errors. In some embodiments of the disclosure, the interleaver 101 may be an optional component. An exemplary interleaver such as the interleaver 101 may be operable to write the coded bits into a matrix column by column and reading them out row by row. Additional details of an exemplary interleaver may be found in the United States application titled "Method and System for Forward Error Correction Decoding with Parity Check for Use in Low Complexity Highly-Spectrally Efficient Communications," which is incorporated herein by reference, as set forth above.

The mapper 102 may comprise suitable logic, interfaces, circuitry and/or code that may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $Log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or the interleaver 101. Additionally, or alternatively, the symbols out of the mapper 102 may pass through another interleaver, which is not shown. In this latter case, the another interleaver may operate substantially similar to the interleaver 101. The United States application titled "Method and System for Forward Error Correction Decoding with Parity Check for Use in Low Complexity Highly-Spectrally Efficient Communications," which is incorporated herein by reference, as set forth above, discloses an exemplary FEC encoder and an interleaver), which application is hereby incorporated by reference herein in its entirety.

The pulse shaper 104 may comprise suitable logic, interfaces, circuitry and/or code that may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project, Fourth Generation, Fourth Generation (4G)), that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via matrix multiplication (e.g., lattice coding), and signals generated via decimation below the Nyquist frequency such that aliasing creates correlation between symbols.

The timing pilot insertion circuit 105 may comprise suitable logic, interfaces, circuitry and/or code that may be operable to insert a pilot signal which may be utilized by the receiver 160 for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may comprise suitable logic, interfaces, circuitry and/or code that may be operable to amplify and/or upconvert the signal 115 to generate the signal 116. Thus, the transmitter front-end 106 may comprise, for example, a power amplifier and/or a mixer. The front-end may introduce non-linear distortion and/or phase noise (and/or other non-idealities) to the signal 116. The non-linearity of the circuit 106 may be represented as FnlTx which may be, for example, a polynomial, or an exponential (e.g., Rapp model). The non-linearity may incorporate memory (e.g., Voltera series).

The communication medium or channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may comprise suitable logic, interfaces, circuitry and/or code that may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx, which may be, for example, a polynomial, or an exponential (e.g., Rapp model). The non-linearity may incorporate memory (e.g., Voltera series).

The timing pilot recovery and removal circuit 110 may comprise suitable logic, interfaces, circuitry and/or code that may be operable to lock to the timing pilot signal inserted by the pilot insertion circuit 105 in order to recover the symbol timing of the received signal. The output 122 may thus comprise the signal 120 minus (i.e., without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may comprise suitable logic, interfaces, circuitry and/or code that may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the input filter 109 may be configured based on: a non-linearity model, $\widehat{Fnl}$, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may comprise suitable logic, interfaces, circuitry and/or code that may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114.

The de-mapper 114 may comprise suitable logic, interfaces, circuitry and/or code that may be operable to map symbols to bit sequences according to a selected modulation scheme. For example, for an N-QAM modulation scheme, the mapper may map each symbol to $Log_2(N)$ bits of the Rx_bitstream. The Rx_bitstream may, for example, be output to a de-interleaver such as the de-interleaver 159 and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

where $P_b$ is the probability that bit b=1. Additional details of an exemplary FEC decoder and/or a de-interleaver may be found in the United States application titled "Method and System for Forward Error Correction Decoding with Parity Check for Use in Low Complexity Highly-Spectrally Efficient Communications," which is incorporated herein by reference, as set forth above.

The de-interleaver 159 may comprise suitable logic, interfaces, circuitry and/or code that may be operable to de-interleave or despread the demapped bits using the reverse spreading algorithm that was utilized by the interleaver 101. In some embodiments of the disclosure, the de-interleaver 159 may be optional. In instances where the interleaver 101 is not present and no interleaving is done in the modulator or transmitter 150, then the de-interleaver 159 is not utilized. Additional details of an exemplary de-interleaver may be found in the United States application titled "Method and System for Forward Error Correction Decoding with Parity Check for Use in Low Complexity Highly-Spectrally Efficient Communications," which is incorporated herein by reference, as set forth above.

In an example implementation, components of the system upstream of the pulse shaper 104 in the transmitter 150 and downstream of the equalizer and sequence estimator 112 in the receiver 160 may be as found in a conventional N-QAM system. Thus, through modification of the transmit side physical layer and the receive side physical layer, aspects of the disclosure may be implemented in an otherwise conventional N-QAM system in order to improve performance of the system in the presence of non-linearity as compared, for example, to use of RRC filters and an N-QAM slicer.

Figure 2:
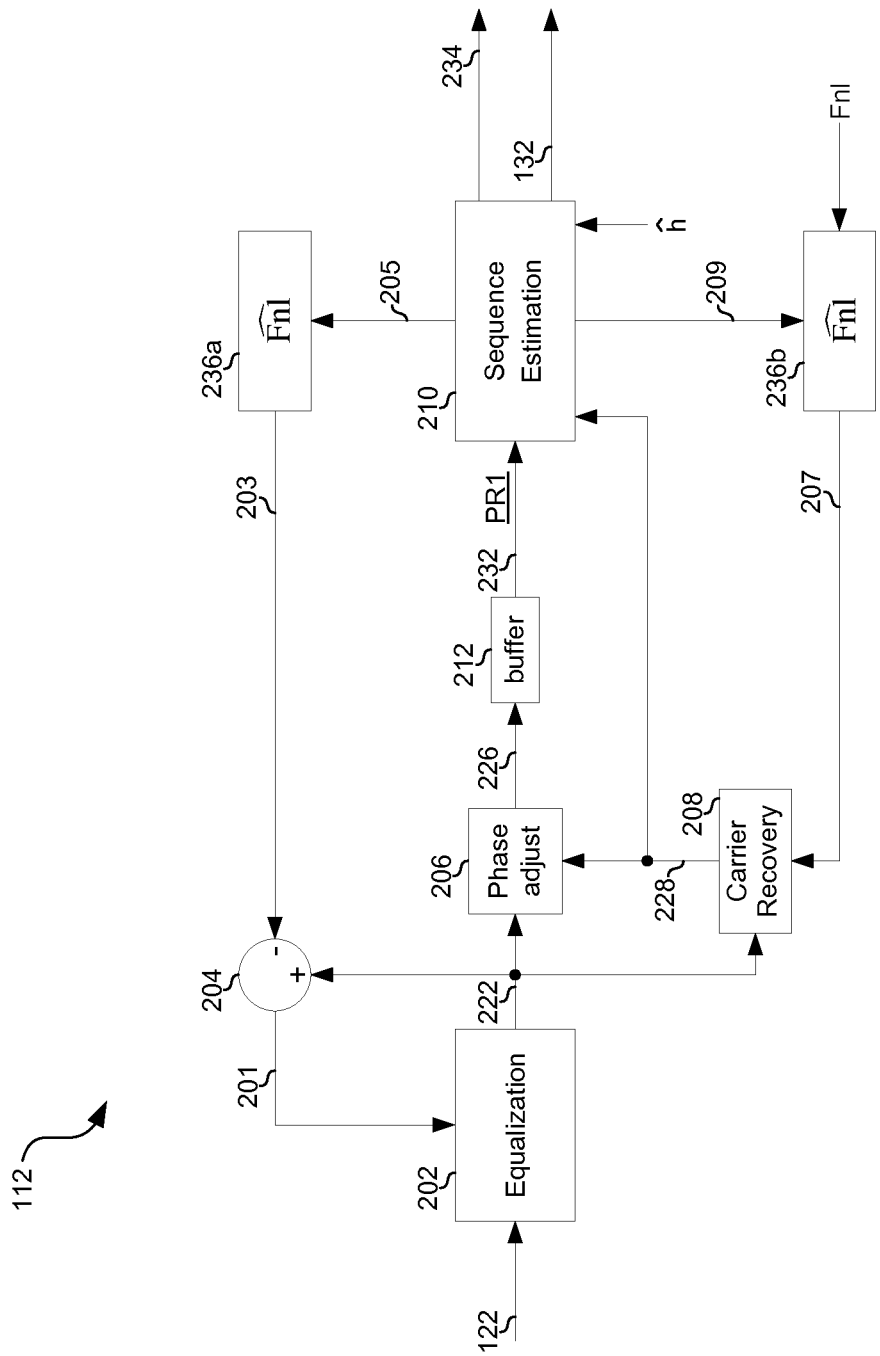
FIG. 2 is a block diagram depicting an example equalization and sequence estimation circuit for use in a system configured for low-complexity, highly-spectrally-efficient communications, in accordance with an embodiment of the disclosure.

FIG. 2 is a block diagram depicting an example equalization and sequence estimation circuit for use in a system configured for low-complexity, highly-spectrally-efficient communications, in accordance with an embodiment of the disclosure. Referring to FIG. 2, there is shown an equalizer circuit 202, a signal combiner circuit 204, a phase adjust circuit 206, a sequence estimation circuit 210, and non-linearity modeling circuits 236a and 236b.

The equalizer 202 may comprise suitable logic, interfaces, circuitry and/or code that may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may comprise suitable logic, interfaces, circuitry and/or code that may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may comprise suitable logic, interfaces, circuitry and/or code that may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 may comprise suitable logic, interfaces, circuitry and/or code that buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

The input to the sequence estimation circuit 210 are the signal 232, the signal 228, and a response ĥ. The response ĥ is based on h (the total partial response, discussed above). For example, the response ĥ may represent a compromise between h (described above) and a filter response that compensates for channel non-idealities such as multi-path. The response ĥ may be conveyed and/or stored in the form of LTx+LRx−1 tap coefficients resulting from convolution of the LTx tap coefficients of the pulse shaper 104 and the LRx tap coefficients of the input filter 109. Alternatively, the response ĥ may be conveyed and/or stored in the form of fewer than LTx+LRx−1 tap coefficients—for example, where one or more taps of the LTx and LRx is ignored due to being below a determined threshold. The sequence estimation circuit 210 may be operable to output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

Figure 3:
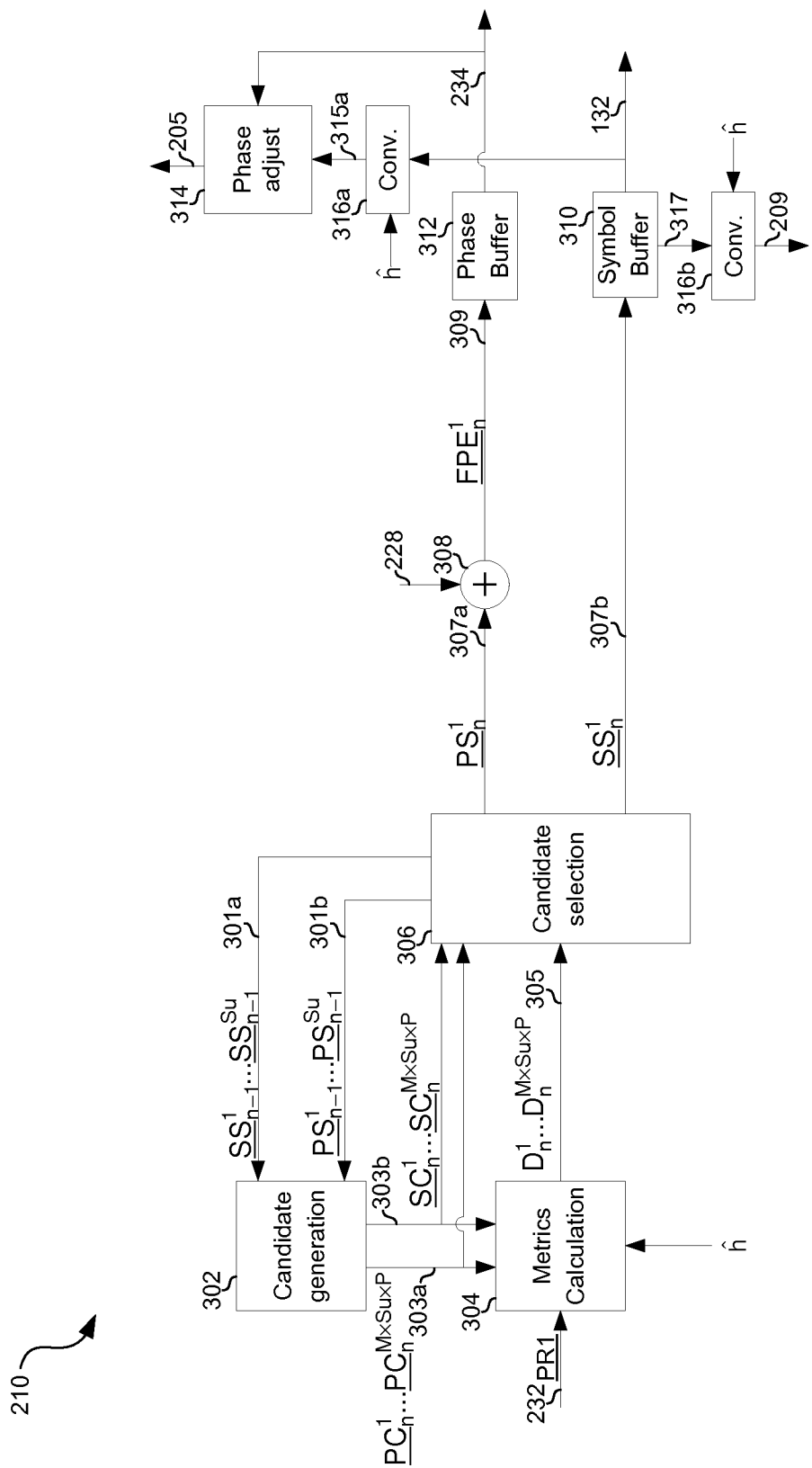
FIG. 3 is a block diagram depicting an example sequence estimation circuit for use in a system configured for low-complexity, highly-spectrally-efficient communications, in accordance with an embodiment of the disclosure.

The non-linear modeling circuit 236a may comprise suitable logic, interfaces, circuitry and/or code that may be operable to apply a non-linearity function $\widehat{Fnl}$ (a model of the non-linearity seen by the received signal en route to the circuit 210) to the signal 205 resulting in the signal 203. Similarly, the non-linear modeling circuit 236b may apply the non-linearity function $\widehat{Fnl}$ to the signal 209 resulting in the signal 207. $\widehat{Fnl}$ may be, for example, a third-order or fifth-order polynomial. Increased accuracy resulting from the use of a higher-order polynomial for $\widehat{Fnl}$ may tradeoff with increased complexity of implementing a higher-order polynomial. Where FnlTx is the dominant non-linearity of the communication system 100, $\widehat{Fnl}$ modeling only FnlTx may be sufficient. Where degradation in receiver performance is above a threshold due to other non-linearities in the system (e.g., non-linearity of the receiver front-end 108) the model $\widehat{Fnl}$ may take into account such other non-linearities FIG. 3 is a block diagram depicting an example sequence estimation circuit for use in a system configured for low-complexity, highly-spectrally-efficient communications, in accordance with an embodiment of the disclosure. Referring to FIG. 3, there is shown a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su \times P}$ based on the partial response signal PR1, the signal 303a conveying the phase candidate vectors $PC_n^1 \ldots PC_n^{M \times Su \times P}$, and the signal 303b conveying the symbol candidate vectors $SC_n^1 \ldots SC_n^{M \times Su \times P}$, where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described below with respect to FIGS. 5A-5D and in the United States patent application titled "Fine Phase Estimation for Highly Spectrally Efficient Communications," which is incorporated herein by reference, as set forth above. In an example implementation, each phase candidate vector may comprise Q phase values and each symbol candidate vector may comprise Q symbols. An example implementation of the metrics calculation block is described below with reference to FIG. 4.

The candidate selection circuit 306 may comprise suitable logic, interfaces, circuitry and/or code that may be operable to select Su of the symbol candidates $SC_n^1 \ldots SC_n^{M \times Su \times P}$ and Su of the phase candidates $PC_n^1 \ldots PC_n^{M \times Su \times P}$ based on the metrics $D_n^1 \ldots D_n^{M \times Su \times P}$. The selected phase candidates are referred to as the phase survivors $PS_n^1 \ldots PS_n^{Su}$. Each element of each phase survivors $PS_n^1 \ldots PS_n^{Su}$. Each element of each phase survivors $PS_n^1 \ldots PS_n^{Su}$ may correspond to an estimate of residual phase error in the signal 232. That is, the phase error remaining in the signal after coarse phase error correction via the phase adjust circuit 206. The best phase survivor $PS_n^1$ is conveyed via signal 307a. The Su phase survivors are retained for the next iteration of the sequence estimation process (at which time they are conveyed via signal 301b). The selected symbol candidates are referred to as the symbol survivors $SS_n^1 \ldots SS_n^{Su}$. Each element of each symbol survivors $SS_n^1 \ldots SS_n^{Su}$ may comprise a soft-decision estimate and/or a hard-decision estimate of a symbol of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described below with reference to FIGS. 5D and 6A-6B.

The candidate generation circuit 302 may comprise suitable logic, interfaces, circuitry and/or code that may be operable to generate phase candidates $PC_n^1 \ldots PC_n^{M \times Su \times P}$ and symbol candidates $SC_n^1 \ldots SC_n^{M \times Su \times P}$ from phase survivors $PS_{n-1}^1 \ldots PS_{n-1}^{Su}$ and symbol survivors $SS_{n-1}^1 \ldots SS_{n-1}^{Su}$, wherein the index n−1 indicates that they are survivors from time n−1 are used for generating the candidates for time n. In an example implementation, generation of the phase and/or symbol candidates may be as, for example, described below with reference to FIGS. 5A and 5B and/or in the United States patent application titled "Joint Sequence Estimation of Symbol and Phase with High Tolerance of Nonlinearity," which is incorporated herein by reference, as set forth above.

The symbol buffer circuit 310 may comprise suitable logic, interfaces, circuitry and/or code, which may comprise a plurality of memory elements that may be operable to store one or more symbol survivor elements of one or more symbol survivor vectors. The phase buffer circuit 312 may also comprise a plurality of memory elements operable to store one or more phase survivor vectors. Example implementations of the buffers 310 and 312 are described below with reference to FIGS. 7B and 7C, respectively.

The combiner circuit 308 may comprise suitable logic, interfaces, circuitry and/or code that may be operable to combine the best phase survivor, $PS_n^1$, conveyed via signal 307a, with the signal 228 generated by the carrier recovery circuit 208 (FIG. 2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_n^1$.

The phase adjust circuit 314 may comprise suitable logic, interfaces, circuitry and/or code that may be operable to adjust the phase of the signal 315a by an amount determined by the signal 234 output by phase buffer 312, to generate the signal 205.

The circuit 316a may comprise suitable logic, interfaces, circuitry and/or code that, which may be operable to perform convolution, and may comprise a FIR filter or IIR filter, for example. The circuit 316a may be operable to convolve the signal 132 with the response ĥ, resulting in the partial response signal 315a. Similarly, the convolution circuit 316b may be operable to convolve the signal 317 with the response ĥ, resulting in the partial response signal 209. As noted above, the response ĥ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). The response ĥ may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209b to compensate for non-linearity in the signal path.

Figure 4:
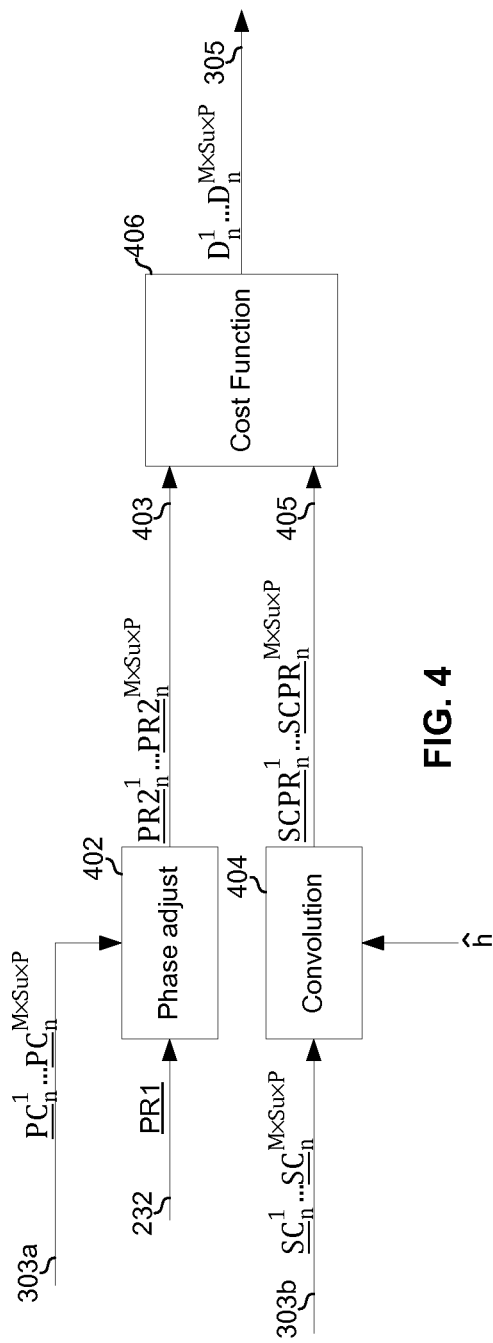
FIG. 4 is a block diagram depicting an example metric calculation circuit for use in a system configured for low-complexity, highly-spectrally-efficient communications, in accordance with an embodiment of the disclosure.

FIG. 4 is a block diagram depicting an example metric calculation circuit for use in a system configured for low-complexity, highly-spectrally-efficient communications, in accordance with an embodiment of the disclosure. Referring to FIG. 4, there is shown a phase adjust circuit 402, a convolution circuit 404, and a cost function calculation circuit 406.

The phase adjust circuit 402 may comprise suitable logic, interfaces, circuitry and/or code that may be operable to phase shift one or more elements of the vector PR1 (conveyed via signal 232) by a corresponding one or more values of the phase candidate vectors $PC_n^1 \ldots PC_n^{M \times Su \times P}$. The signal 403 output by the phase adjust circuit 402 thus conveys a plurality of partial response vectors $PR2_n^1 \ldots PR2_n^{M \times Su \times P}$, each of which comprises a plurality of phase-adjusted versions of PR1.

The circuit 404 may comprise suitable logic, interfaces, circuitry and/or code that may be operable to perform convolution, may comprise a FIR filter or IIR filter, for example. The circuit 404 may be operable to convolve the symbol candidate vectors $SC_n^1 \ldots SC_n^{M \times Su \times P}$ with ĥ. The signal 405 output by the circuit 404 thus conveys vectors $SCPR_n^1 \ldots SCPR_n^{M \times Su \times P}$, each of which is a candidate partial response vector.

The cost function circuit 406 may comprise suitable logic, interfaces, circuitry and/or code that may be operable to generate metrics indicating the similarity between one or more of the partial response vectors $PR2_n^1 \ldots PR2_n^{M \times Su \times P}$ and one or more of the vectors $SCPR_n^1 \ldots SCPR_n^{M \times Su \times P}$ to generate error metrics $D_n^1 \ldots D_n^{M \times Su \times P}$. In an example implementation, the error metrics may be Euclidean distances calculated as shown below in equation 1.

$$D_n^i = |(SCPR_n^i) - (PR2_n^i)|^2 \qquad \text{EQ. 1}$$

for $1 \leq i \leq M \times Su \times P$.

FIGS. 5A-5D depict portions of an example sequence estimation process performed by a system configured for low-complexity, highly-spectrally-efficient communications, in accordance with an embodiment of the disclosure. In FIGS. 5A-5D it is assumed, for purposes of illustration, that M=4 (a symbol alphabet of $\alpha, \beta, \chi, \delta$), Su=3 (three symbol survivors are selected each iteration), Psu=Su (three phase survivors are selected each iteration), P=3 (a phase alphabet of plus, minus, and zero), and that Q (vector length) is 4.

Figure 5A:
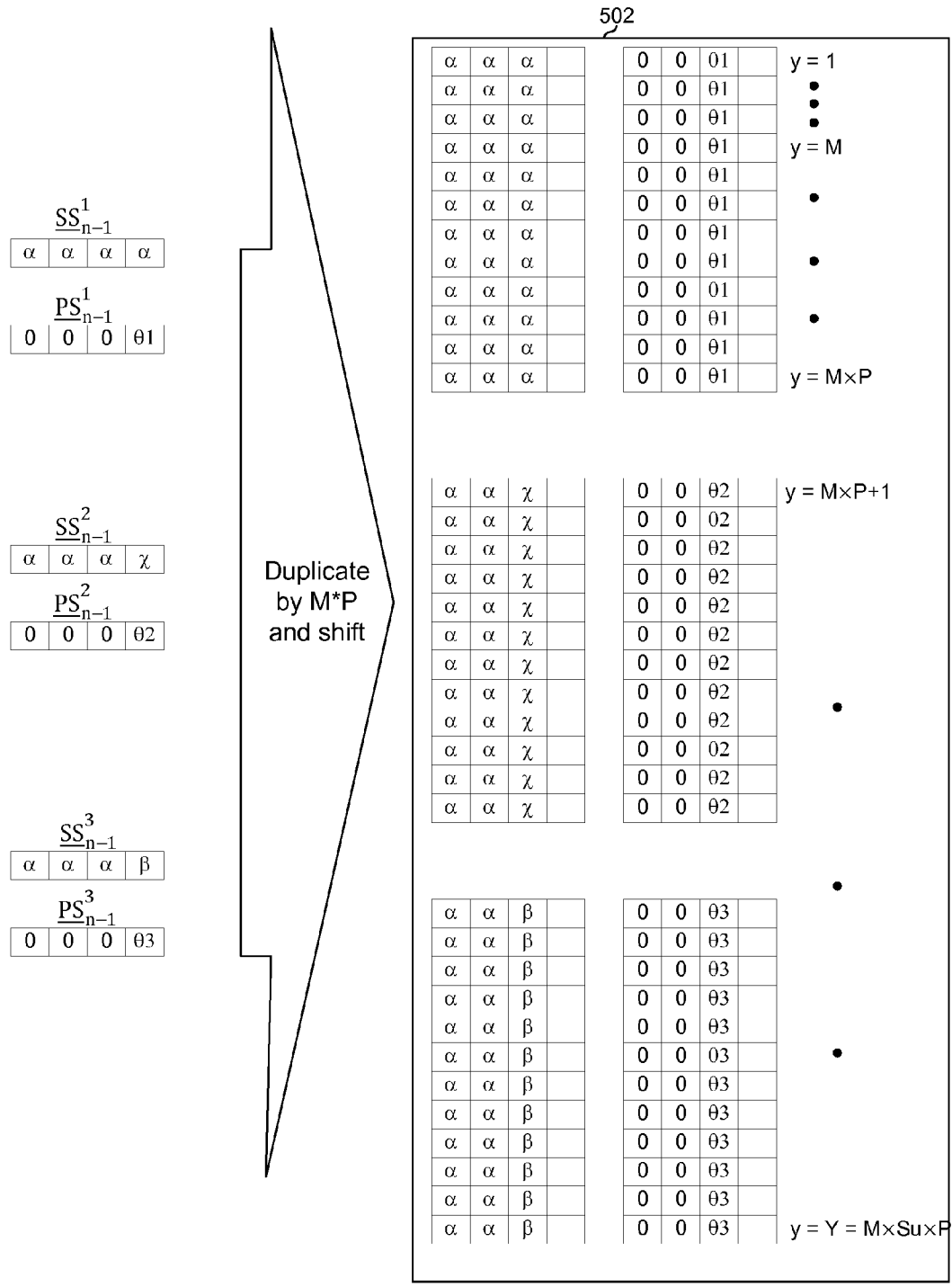
FIGS. 5A-5D depict portions of an example sequence estimation process performed by a system configured for low-complexity, highly-spectrally-efficient communications, in accordance with an embodiment of the disclosure.

Referring to FIG. 5A, there is shown phase and symbol survivors from time n−1 on the left side of the figure. The first step in generating symbol candidates and phase candidates from the survivors is to duplicate the survivors and shift the contents to free up an element in each of the resulting vectors called out as 502 on the right side of FIG. 5A. In the example implementation depicted, the survivors are duplicated M*P−1 times and shifted one element.

Figure 5B:
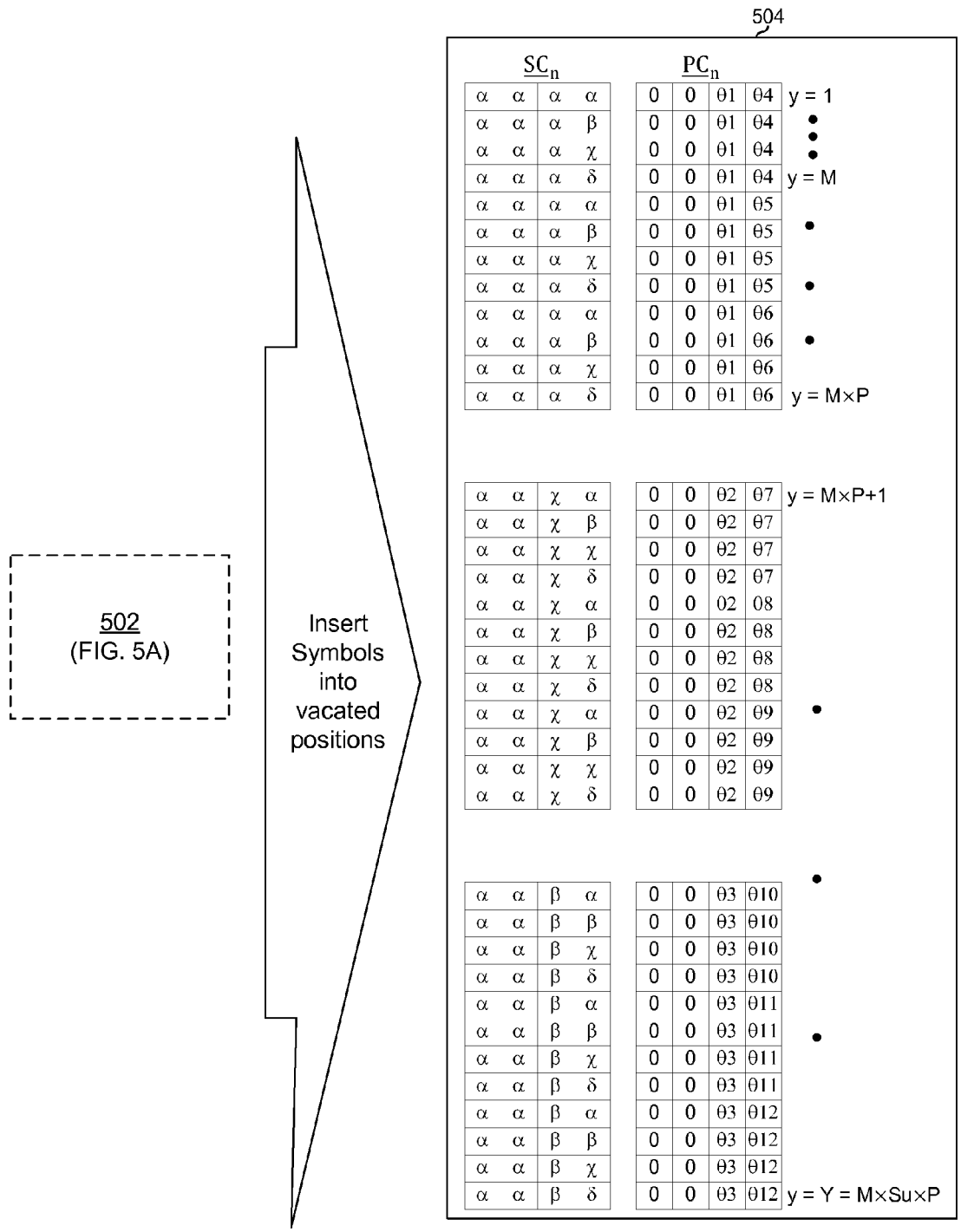

Referring to FIG. 5B, the next step in generating the candidates is inserting symbols in the vacant elements of the symbol vectors and phase values in the vacant elements of the phase vectors, resulting in the symbol candidates and phase candidate for time n (called out as 504 in FIG. 5B). In the example implementation depicted, each of the M possible symbol values is inserted into Su*P symbol candidates, and each of the P phase values may be inserted into M*Su candidates. In the example implementation depicted, $\theta5$ is a reference phase value calculated based on phase survivor $PS_{n-1}^1$. For example, $\theta5$ may be the average (or a weighted average) of the last two or more elements of the phase survivor $PS_{n-1}^1$ (in the example shown, the average over the last two elements would be $(\theta5+0)/2$). In the example implementation depicted, $\theta4 = \theta5 - \Delta\theta$, and $\theta6 = \theta5 + \Delta\theta$, where $\Delta\theta$ is based on: the amount of phase noise in signal 226, slope (derivative) of the phase noise in signal 226, signal-to-noise ratio (SNR) of signal 226, and/or capacity of the channel 107. Similarly, in the example implementation shown, $\theta8$ is a reference phase value calculated based on phase survivor $PS_{n-1}^2$, $\theta7 = \theta8 - \Delta\theta$, $\theta9 = \theta8 + \Delta\theta$, $\theta11$ is a reference phase value calculated based on phase survivor $PS_{n-1}^3$, $\theta10 = \theta11 - \Delta\theta$, and $\theta12 = \theta11 + \Delta\theta$.

Figure 5C:
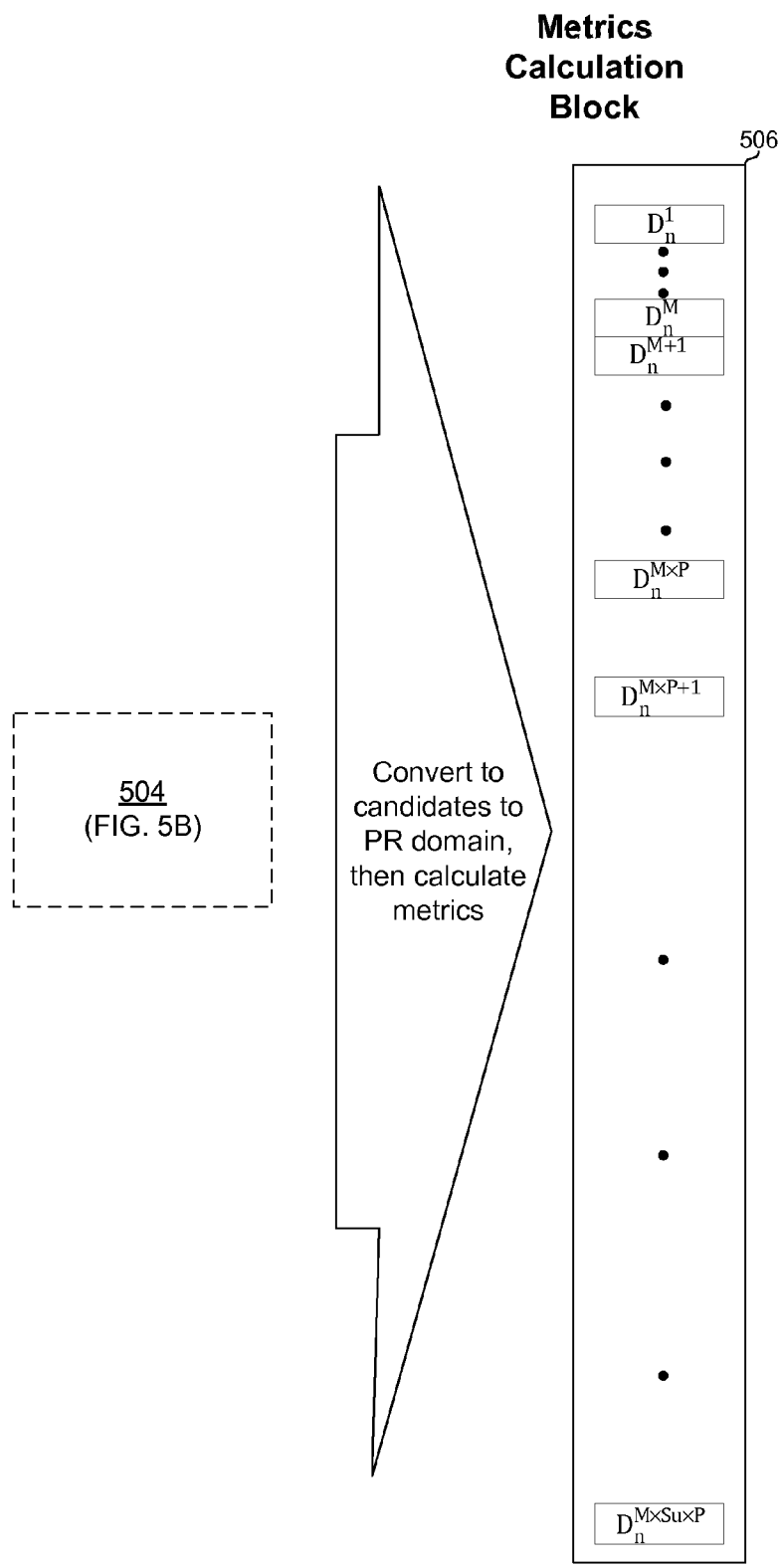

Referring to FIG. 5C, as described above with reference to FIG. 4, the symbol candidates are transformed to the partial response domain via a convolution, the reference signal PR1 is phase adjusted, and then the metrics $D_n^1 \ldots D_n^{M \times Su \times P}$ are calculated based on the partial response signals $PR2_n^1 \ldots PR2_n^{M \times Su \times P}$ and $SCPR_n^1 \ldots SCPR_n^{M \times Su \times P}$.

Figure 5D:
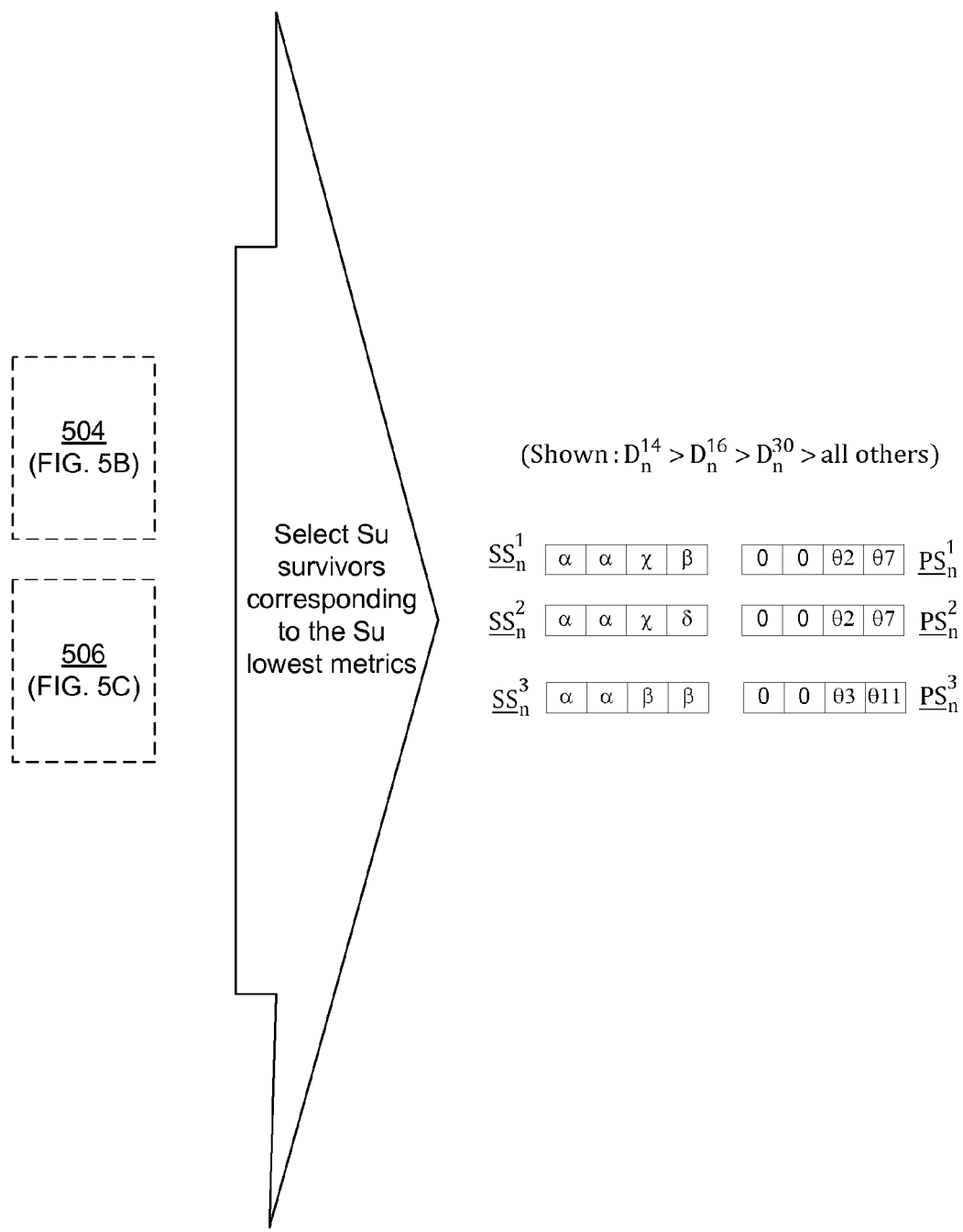

Referring to FIG. 5D, the metrics calculated in FIG. 5C are used to select which of the candidates generated in FIG. 5B are selected to be the survivors for the next iteration of the sequence estimation process. FIG. 5D depicts an example implementation in which the survivors are selected in a single step by simply selecting Su candidates corresponding to the Su best metrics. In the example implementation depicted, it is assumed that metric $D_n^{14}$ is the best metric, that $D_n^{16}$ is the second best metric, and that $D_n^{30}$ is the third-best metric. Accordingly, symbol candidate $SC_n^{14}$ is selected as the best symbol survivor, $PC_n^{14}$ is selected as the best phase survivor, symbol candidate $SC_n^{16}$ is selected as the second-best symbol survivor, $PC_n^{16}$ is selected as the second-best phase survivor, symbol candidate $SC_n^{30}$ is selected as the third-best symbol survivor, and $PC_n^{30}$ is selected as the third-best phase survivor. The survivor selection process of FIG. 5D may result in selecting identical symbol candidates, which may be undesirable. A survivor selection process that prevents redundant symbol survivors is described below with reference to FIGS. 6A and 6B.

Figure 6A:
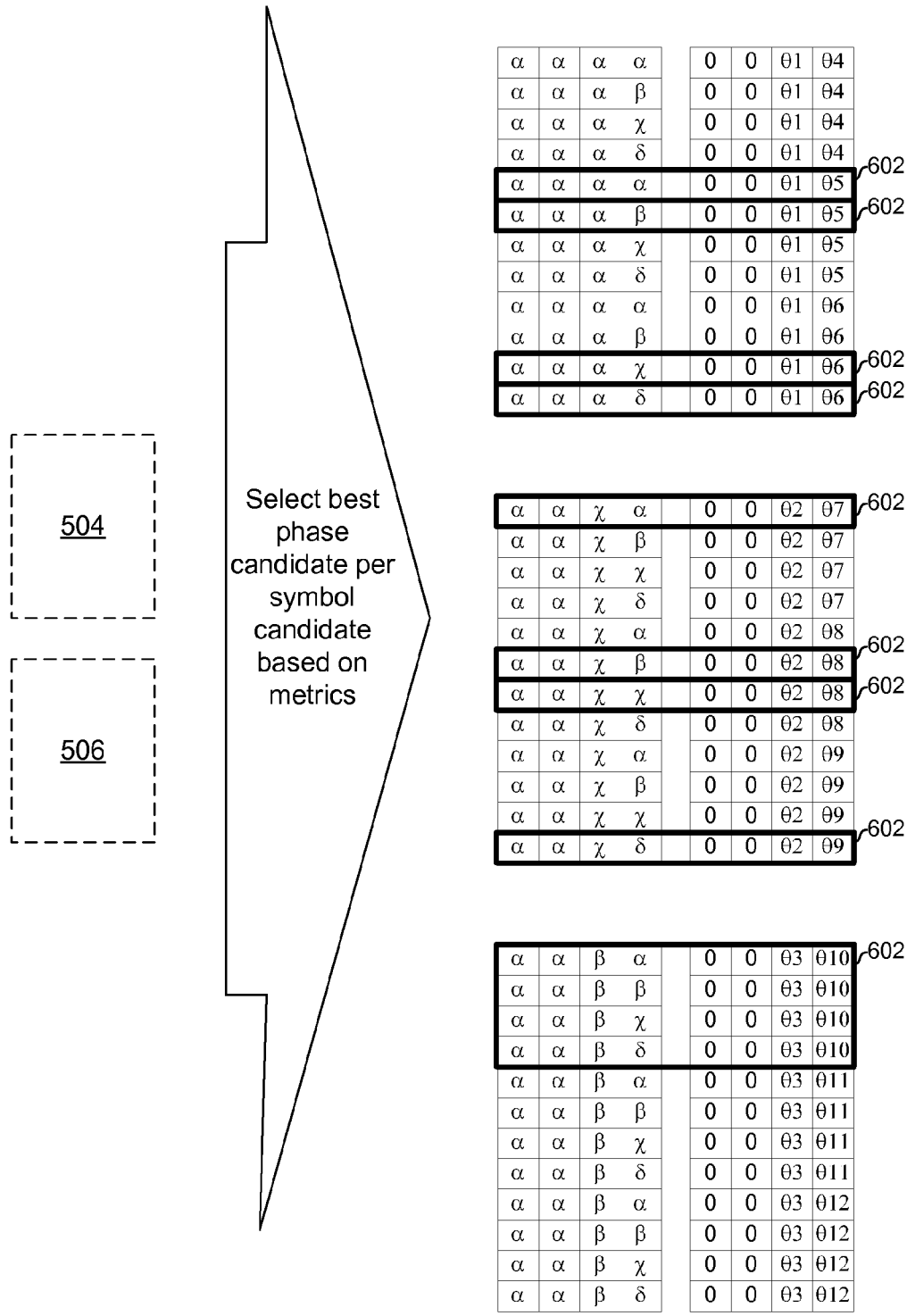
FIGS. 6A and 6B depict an example survivor selection process that is an alternative to the process depicted in FIG. 5D, in accordance with an embodiment of the disclosure.
Figure 6B:
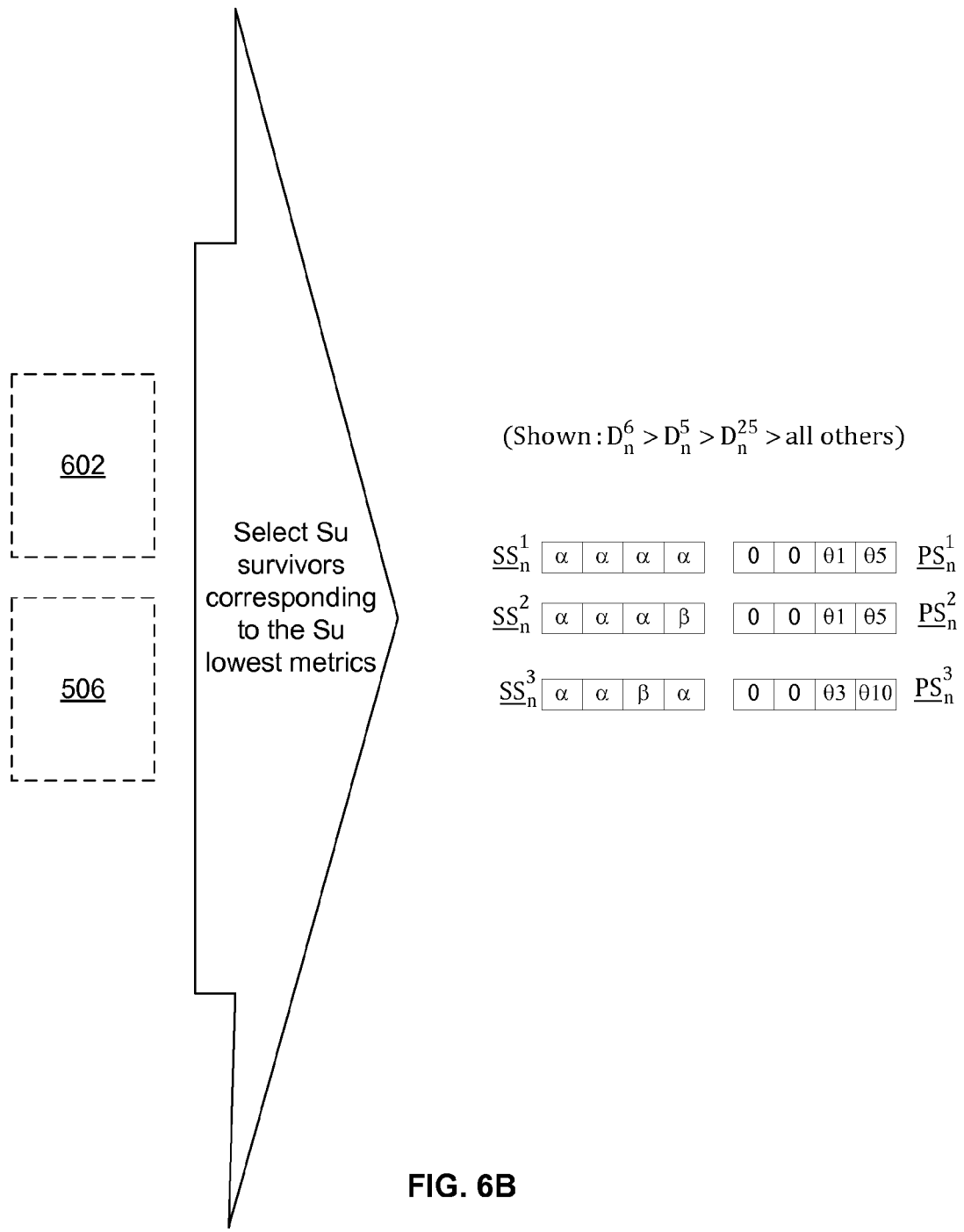

FIGS. 6A and 6B depict an example survivor selection process that is an alternative to the process depicted in FIG. 5D, in accordance with an embodiment of the disclosure. In FIG. 6A, the candidates generated in FIG. 5B and the metrics calculated in FIG. 5C are used to select the best phase candidate for each symbol candidate (selected candidates are called out by reference designator 602). In FIG. 6B, the best Su of the candidates selected in FIG. 6A are selected as the survivors for the next iteration of the sequence estimation process. In the example implementation depicted, it is assumed that metric $D_n^6$ is the best metric, that $D_n^5$ is the second-best metric, and that $D_n^{25}$ is the third-best metric. Accordingly, symbol candidate $SC_n^6$ is selected as the best symbol survivor, $PC_n^6$ is selected as the best phase survivor, symbol candidate $SC_n^6$ is selected as the second-best symbol survivor, $PC_n^5$ is selected as the second-best phase survivor, symbol candidate $SC_n^{25}$ is selected as the third-best symbol survivor, and $PC_n^{25}$ is selected as the third-best phase survivor.

Although the implementations described with reference to FIGS. 5A-6B use one phase survivor per symbol survivor, the disclosure is not limited in this regard. Accordingly, other example implementations may use PSu (e.g., PSu<Su) phase survivors that are used commonly for each symbol survivor. In one or more of such implementations, each of the phase survivors $PS_{n-1}^1 \ldots PS_{n-1}^{PSu}$ may be duplicated P times to generate phase successors, and then duplicated M*Su times to be associated with corresponding symbols successors. The number of symbol candidates in such implementations may be M*Su*PSu*P.

Figure 7A:
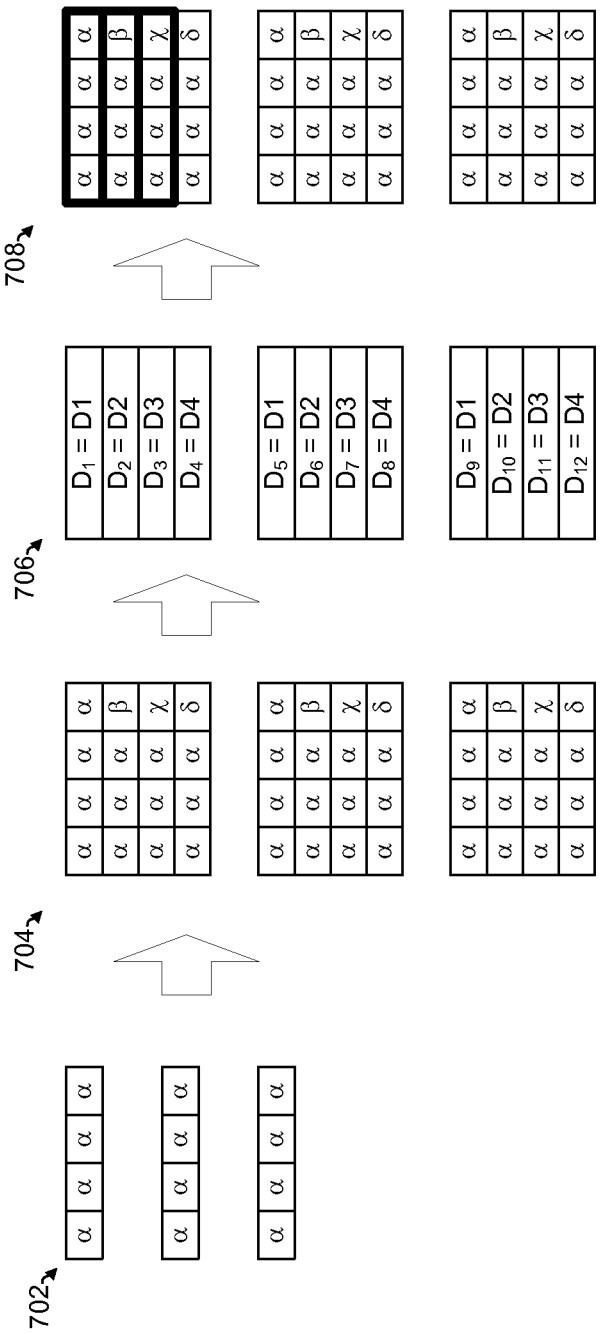
FIG. 7A is a diagram illustrating initialization of the sequence estimation process, in accordance with an embodiment of the disclosure.

FIG. 7A is a diagram illustrating initialization of the sequence estimation process, in accordance with an embodiment of the disclosure. In FIG. 7A it is again assumed, for illustration, that M=4 (a symbol alphabet of $\alpha, \beta, \chi, \delta$), Su=3 (three symbol survivors are selected each iteration), Psu=Su (three phase survivors are selected each iteration), P=3 (a phase alphabet of plus, minus, and zero), and that Q (vector length) is 4. On the far left of FIG. 7A is shown symbol survivors 702 after receipt of a preamble sequence. Because the preamble is a deterministic sequence, all symbol survivors are forced to the same values. From the survivors 702 are generated the candidates 704 and metrics 706 are calculated based on the candidates 704. In the example implementation shown, since the survivors were all the same, there are only four unique symbol candidates. The metrics for the four candidates are, respectively, D1, D2, D3, and D4. Accordingly, if the three candidates corresponding to the best three metrics were chosen, then the three candidates corresponding to D1 would all be chosen and the survivors for the next iteration would again all be identical. Accordingly, the three best, non-redundant symbol candidates are selected (as indicated by the heavy lines). Consequently, one of the candidates having the metric value D1 is selected, one of the candidates having the metric value D2 is selected, and one of the candidates having metric value D3 is selected, such that three non-redundant survivors are used for the next iteration.

Figure 7B:
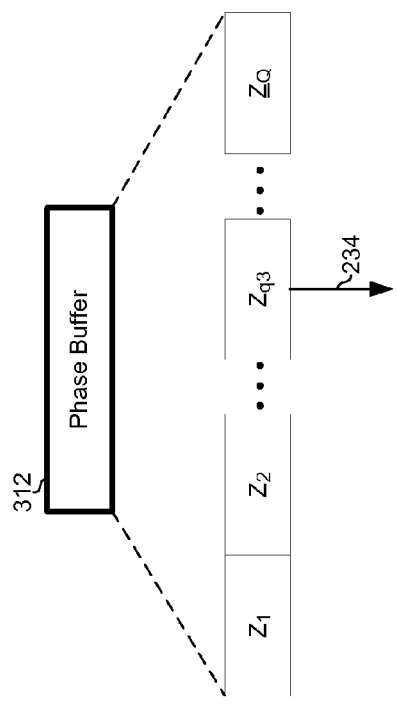
FIG. 7B depicts an example implementation of the phase buffer shown in FIG. 3, in accordance with an embodiment of the disclosure.

FIG. 7B depicts an example implementation of the phase buffer shown in FIG. 3, in accordance with an embodiment of the disclosure. In the example implementation depicted, the depth of the phase buffer 312 is Q and the phase value stored at element q is represented as $Z_q$, for q from 1 to Q. In the example implementation depicted, the value stored in element q3 is output as the signal 234. For each iteration of the sequence estimation process, Q elements of the phase buffer 312 storing Q values of $PS_{n-1}^1$ may be overwritten with Q values of $PS_n^1$.

Figure 7C:
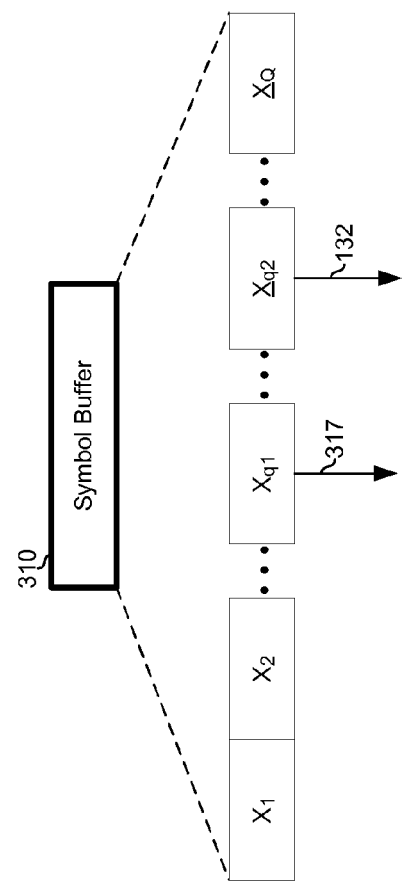
FIG. 7C depicts an example implementation of the symbol buffer shown in FIG. 3, in accordance with an embodiment of the disclosure.

FIG. 7C depicts an example implementation of the symbol buffer shown in FIG. 3, in accordance with an embodiment of the disclosure. In the example implementation depicted, the value(s) stored in one or more elements starting with index q1 (e.g., values stored in elements q1 through q1+L−1) is/are output as the signal 317 and the value(s) stored in one or more elements starting with index q2 (e.g., values stored in elements q2 through q2+L−1) is/are output as the signal 132. Because the value(s) output as the signal 317 start from a lower-indexed element of the symbol buffer, the delay between receiving a signal sample and outputting the corresponding value of signal 317 is shorter than the delay between receiving a signal sample and outputting the corresponding value of the signal 132. Because the value(s) output as the signal 132 start from a higher-indexed element, however, it/they is/are likely to be less error-prone. These concepts are further illustrated with reference to in FIGS. 7D and 7E. In an example implementation, q2 is equal to q3.

Figure 7D:
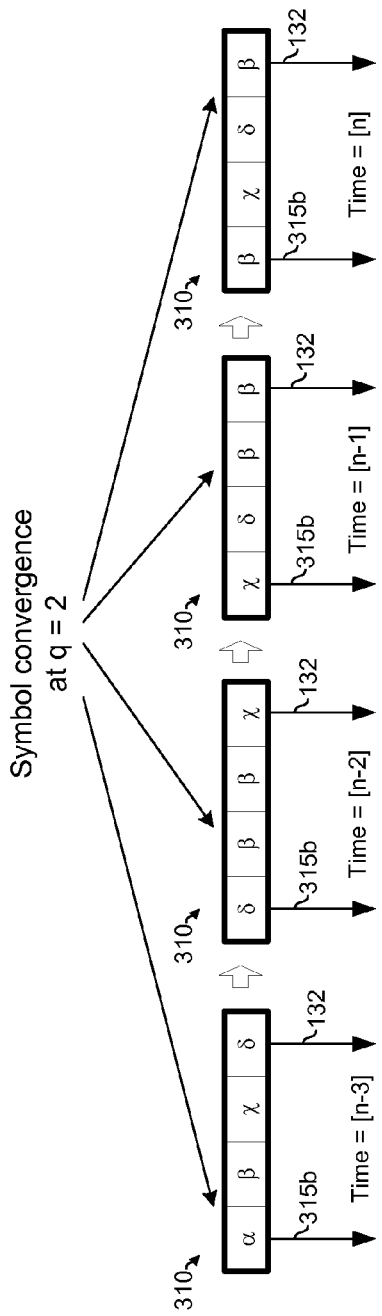
FIG. 7D depicts contents of an example symbol buffer over a plurality of iterations of a sequence estimation process, in accordance with an embodiment of the disclosure.

FIG. 7D depicts contents of an example symbol buffer over a plurality of iterations of a sequence estimation process, in accordance with an embodiment of the disclosure. In the example implementation shown in FIG. 7D, the symbol buffer 310 comprises four elements with the signal 317 corresponding to the contents of the first element and the signal 132 corresponding to the fourth element. In the example implementation depicted, during each iteration of the sequence estimation process, candidates are generated by duplicating the survivors from the previous iteration, shifting the values by one element, and the appending a new value into the vacated element. Accordingly, ideally each survivor would differ from the previous survivor only in the lowest-indexed element (corresponding to the most-recent symbol). Where other elements of the most-recent survivor differ from corresponding elements of the previous survivor, such difference indicates that there is an error in those elements (either in the most-recent survivor or in the previous survivor). Given the convolutional nature of the partial response signal, symbols at higher indexes in the buffer are more reliable. Thus the symbol values will tend to converge as they move toward the right in FIG. 7D.

Figure 7E:
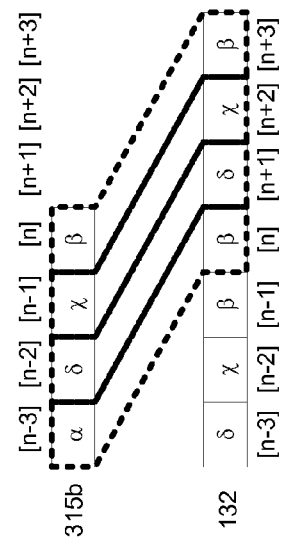
FIG. 7E depicts generated signals corresponding to the symbol buffer contents shown in FIG. 7D, in accordance with an embodiment of the disclosure.

FIG. 7E shows the contents of example symbol buffer 310 at times n−3, n−2, n−1, and n. At time n−3, a symbol survivor having values $\alpha$, $\beta$, $\chi$, $\delta$ is stored in the symbol buffer 310. FIG. 7E depicts generated signals corresponding to the symbol buffer contents shown in FIG. 7D, in accordance with an embodiment of the disclosure. In FIG. 7E, the values of the signals are shown for times n−3 to time n+3. The dashed lines in FIG. 7E illustrate the delay between the signal 317 and the signal 132.

Accordingly, as shown in FIG. 7E, the value of signal 317 at time n−3 is '$\alpha$' and the value of signal 132 is '$\delta$.' At time n−2, a new symbol survivor having values $\delta$, $\beta$, $\beta$, $\chi$ is stored in the symbol buffer 310. Accordingly, as shown in FIG. 7E, the value of signal 317 at time n−2 is '$\delta$' and the value of signal 132 is '$\chi$.' At time n−1, a new symbol survivor having values $\chi$, $\delta$, $\beta$, $\beta$ is stored in the symbol buffer 310. Accordingly, as shown in FIG. 7E, the value of signal 317 at time n−1 is '$\chi$' and the value of signal 132 is '$\beta$.' At time n, a new symbol survivor having values $\beta$, $\chi$, $\delta$, $\beta$ is stored in the symbol buffer 310. Accordingly, as shown in FIG. 7E, the value of signal 317 at time n is '$\beta$' and the value of signal 132 is '$\beta$.' Thus, in the example scenario depicted in FIG. 7D, the value in the first element of the symbol buffer 310 at time n−3 was erroneous and the symbol did not converge until it reached the second element (q=2) of the buffer 310. That is, at time n−2 the symbol changed from $\alpha$ to $\beta$ and then remained $\beta$ at times n−1 and n. This illustrates the consequence of taking signal 317 from the first element of the symbol buffer 310 and taking the signal 132 from the fourth element of the symbol buffer 312. Namely, the signal 317 has less delay than the signal 132 but is also more error prone than the signal 132.

Figure 8:
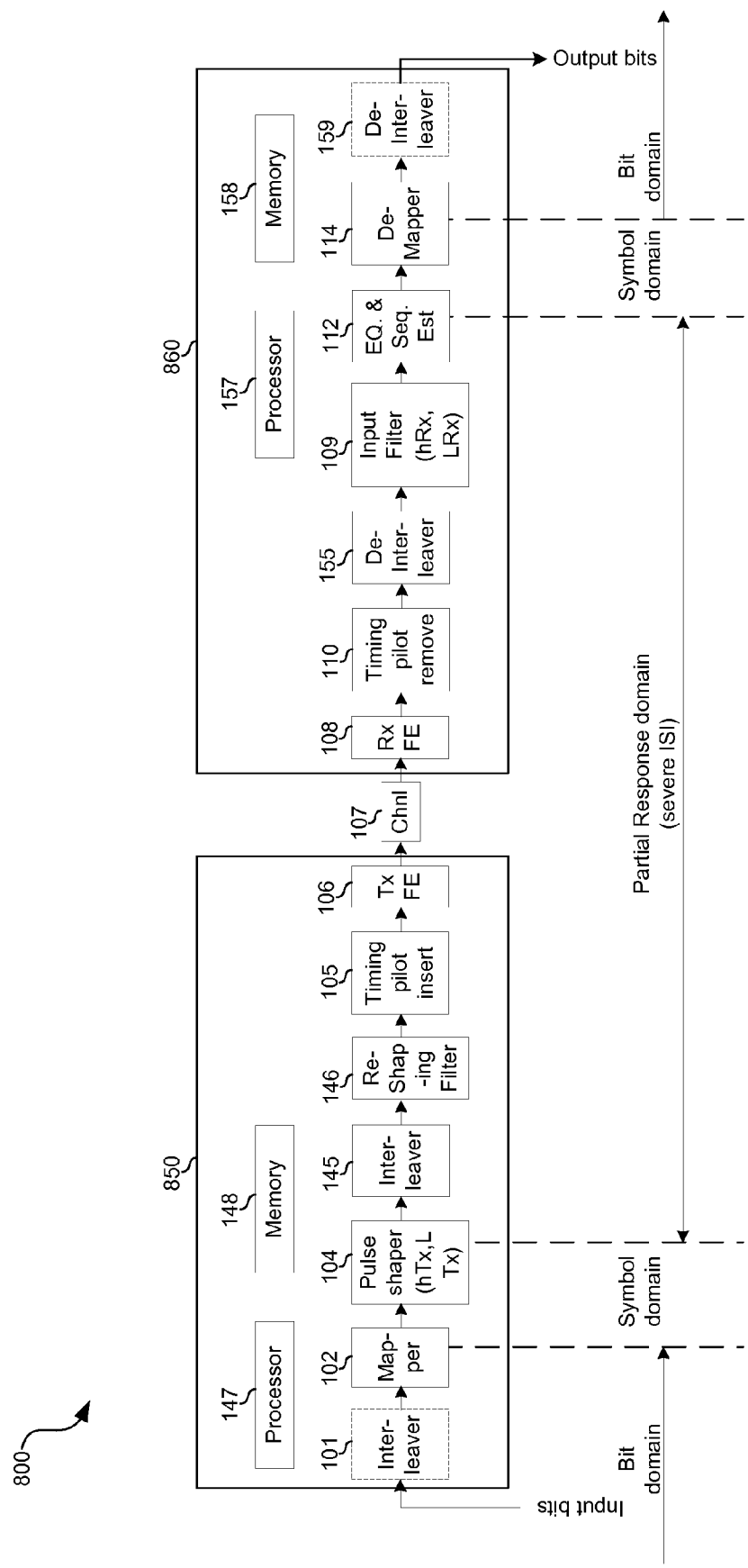
FIG. 8 is a diagram illustrating another exemplary embodiment of the modulator and demodulator of FIG. 1, which respectively comprises an additional interleaver and a reshaping filter, which operates in the partial response domain, in accordance with an embodiment of the disclosure.

FIG. 8 is a diagram illustrating another exemplary embodiment of the modulator and demodulator of FIG. 1, which respectively comprises an additional interleaver and a reshaping filter, which operates in the partial response domain, in accordance with an embodiment of the disclosure. Referring to FIG. 8, there is shown a system 800. The system 800 comprises an interleaver circuit 101, a mapper circuit 102, a pulse shaping filter circuit 104, an interleaver 145, a reshaping filter 146, a timing pilot insertion circuit 105, a transmitter front-end (Tx FE) circuit 106, a processor 147, memory 148, a channel 107, a receiver front-end (Rx FE) circuit 108, a timing pilot removal circuit 110, a de-interleaver 155, an input filter circuit 109, an equalization and sequence estimation circuit 112, a de-mapping circuit 114, a de-interleaver 159, a processor 157 and memory 158. The components 101, 102, 104, 145, 146, 105, 106, 147 and 148 may be part of a modulator or transmitter 850. In various exemplary embodiments of the disclosure, the modulator or transmitter 850 may comprise a base station or access point, a router, a gateway, a mobile device, a server, a computer, a computer peripheral device, a table, a modem, and/or a set-top box. The components 108, 110, 155, 109, 112, 114, 157, 158 and 159 may be part of a demodulator or receiver 860. In various exemplary embodiments of the disclosure, the demodulator or receiver 860 may comprise a base station or access point, a router, a gateway, a mobile device, a server, a computer, a computer peripheral device, a table, a modem, a and/or a set-top box. A device that comprises the modulator or transmitter 850 and the demodulator or receiver 860 may be referred to as a modem (modulator/demodulator) or a transceiver (transmitter/receiver). The modulator or transmitter 850 and the demodulator or receiver 860 may communicate via the communication medium or channel 107.

In the modulator or transmitter 850, the interleaver circuit 101, the mapper circuit 102, the pulse shaping filter circuit 104, the timing pilot insertion circuit 105, the transmitter front-end circuit 106, the processor 147 and the memory 148 may be substantially similar to the corresponding components disclosed in FIG. 1. The modulator or transmitter 850 further comprises an interleaver 145 and a reshaping filter 146. The interleaver 145 may be coupled to an output of the pulse shaping filter circuit 104 and an input of the reshaping filter 146. The reshaping filter 146 may be coupled to an output of the interleaver 145 and an input of the timing pilot insertion circuit 105.

In the demodulator or receiver 860, the receiver front-end 108, the timing pilot removal circuit 110, the input filter circuit 109, the equalization and sequence estimation circuit 112, the de-mapping circuit 114, the de-interleaver 159, the processor 157 and the memory 158 may be substantially similar to the corresponding components disclosed in FIG. 1. The demodulator or receiver 860 further comprises a de-interleaver 155, which is coupled to an output of the timing pilot removal circuit 110 and the input filter circuit 109.

The interleaver 145 may comprise suitable logic, circuitry, interfaces and/or code that may be operable to interleave partial response samples. In accordance with an embodiment of the disclosure, the interleaver 145 operates in the partial response domain and is operable to interleave or spread the partial response samples resulting from the pulse shaping filter circuit 104 over time. The resulting spread partial response samples may be communicated to the reshaping filter 146.

The reshaping filter 146 may comprise suitable logic, circuitry, interfaces and/or code that may be operable to shape the output signal from the Interleaver circuit 145. In this regard, the reshaping filter 146 operates in the partial response domain and is operable to filter the resulting interleaved output from the interleaver 145 in order to ensure compliance of the transmitted signal spectrum with a given spectral mask (e.g., by communication standard), that might be affected by the interleaver 145 operation. The reshaping filter 146 may be, for example, a partial response or zero ISI based filter (e.g., RRC). The resulting reshaped signal generated from the reshaping filter 146 may be communicated to the timing pilot insertion circuit 105 for processing. The other processing that is done within the modulator or transmitter 850 is substantially similar to the processing that is done by the corresponding components of the modulator or receiver 150 as described with respect to FIG. 1.

The deinterleaver 155 may comprise suitable logic, circuitry, interfaces and/or code that may be operable to deinterleave partial response samples. In accordance with an embodiment of the disclosure, the de-interleaver 155 operates in the partial response domain and is operable to de-interleave or de-spread the output signal generated from the timing pilot removal circuit 110. The resulting de-spread partial response samples may be communicated to the input filter circuit 109 for processing. The other processing that is done within the demodulator or receiver 860 is substantially similar to the processing that is done by the corresponding components of the demodulator or receiver 160 as described with respect to FIG. 1.

Figure 9:
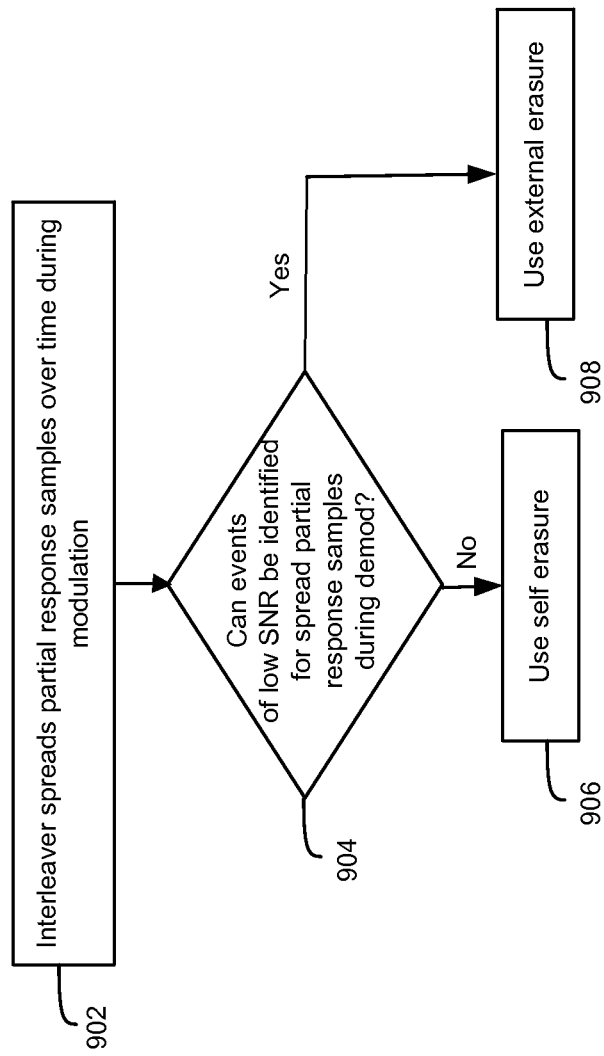
FIG. 9 is a flow chart that illustrates exemplary steps to determine what type of erasure should be utilized, in accordance with an embodiment of the disclosure.

FIG. 9 is a flow chart that illustrates exemplary steps to determine what type of erasure should be utilized, in accordance with an embodiment of the disclosure. Referring to FIG. 9, there is shown exemplary steps 902-908. In step 902, the interleaver 145 is operable to spread partial response samples over time. The spreading of the partial response samples over time may occur during modulation by the modulator 850. The spreading of the partial response signals over time may be utilized in, for example, cable systems, such as a cable modem.

In step 904, a determination is made as to whether events of low SNR may be identified for the spread partial response samples. The determination of whether the events of low SNR may be identified for the spread partial response samples occurs during sequence estimation during demodulation. If in step 904, the events of low SNR cannot be identified for the spread partial response samples (e.g., because the events of low SNR may be occurring too frequently for the equalization circuit 202 to track), then in step 906, self erasure may be utilized. If in step 804, the event of low SNR may be identified for the spread partial response samples, then in step 908, external erasure is utilized.

Figure 10:
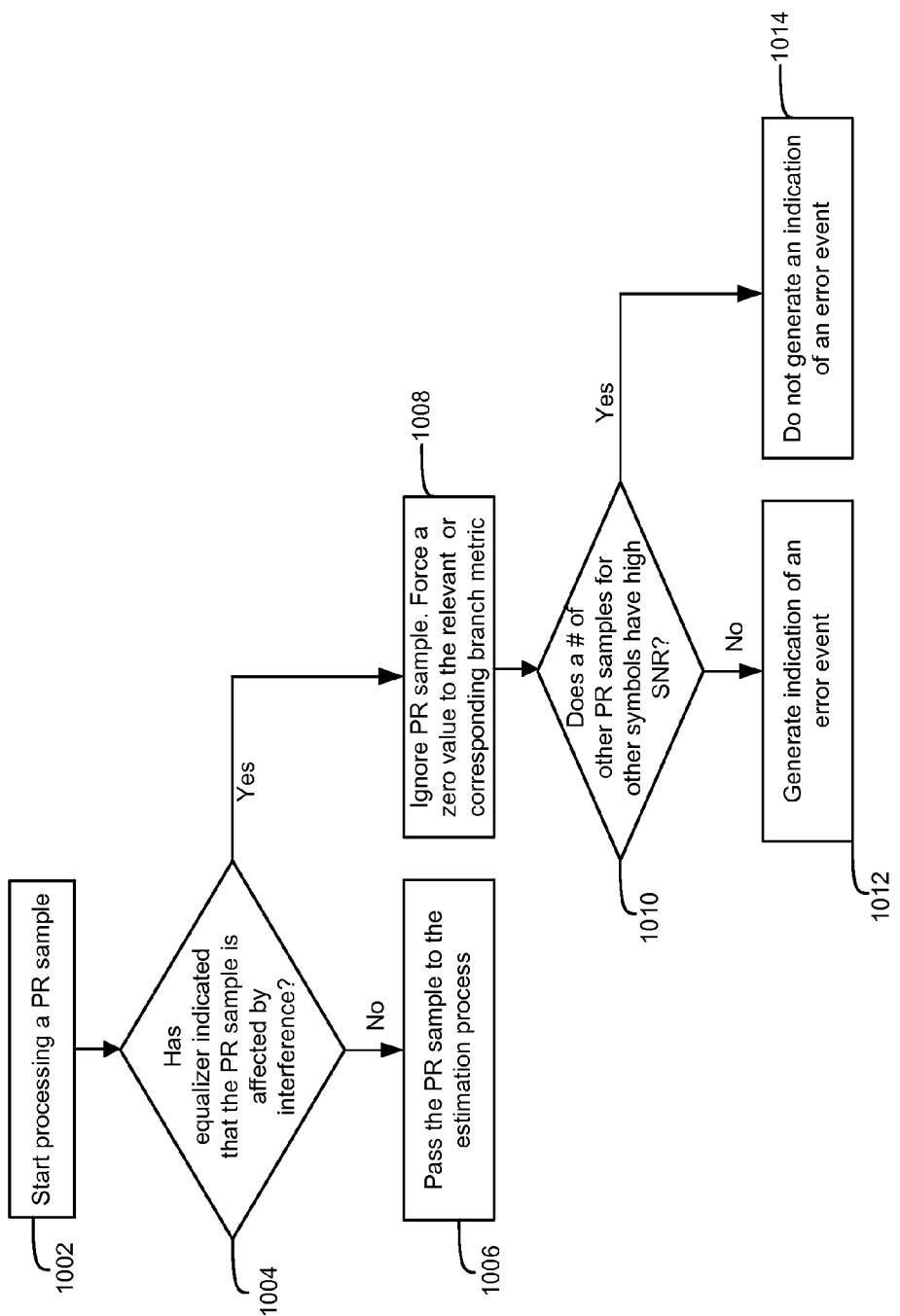
FIG. 10 is a flow chart that illustrates exemplary steps for sequence estimation when utilizing external erasure, in accordance with an embodiment of the disclosure.

FIG. 10 is a flow chart that illustrates exemplary steps for sequence estimation when utilizing external erasure, in accordance with an embodiment of the disclosure. Referring to FIG. 10, there is shown exemplary steps 1002-1014. In step 1002, the processing of a partial response sample starts. In step 1004, a determination is made as to whether the equalizer has indicated that the PR sample is affected by interference (i.e., indicated that the PR sample is "bad"). If in step 1004, the equalizer has not indicated that the PR sample was affected by interference, then in step 1006, the sample is passed to the sequence estimation process. If in step 1004, the equalizer has indicated that the PR sample was affected by interference (i.e., that the PR sample is "bad"), then in step 1008, the sequence estimation ignores the PR sample and forces a zero value to the relevant or corresponding branch metric(s). The process described in FIG. 10 may be repeated for every incoming PR sample.

In step 1010, it is determined whether a number of other PR samples for other symbols have a high SNR. In other words, it is determined whether a sufficient number of other partial response samples corresponding to other symbols in the sequence to be estimated have a high SNR (e.g., SNR above a determined threshold). If in step 1010, it is determined that a sufficient number of the other partial response samples do not have a high SNR, then in step 1012, an indication of an error event is generated (e.g., a flag bit is set in memory). If in step 1010, it is determined that a sufficient number of the other partial response samples do have a high SNR, then in step 1014, an indication of an error event is not generated.

Figure 11:
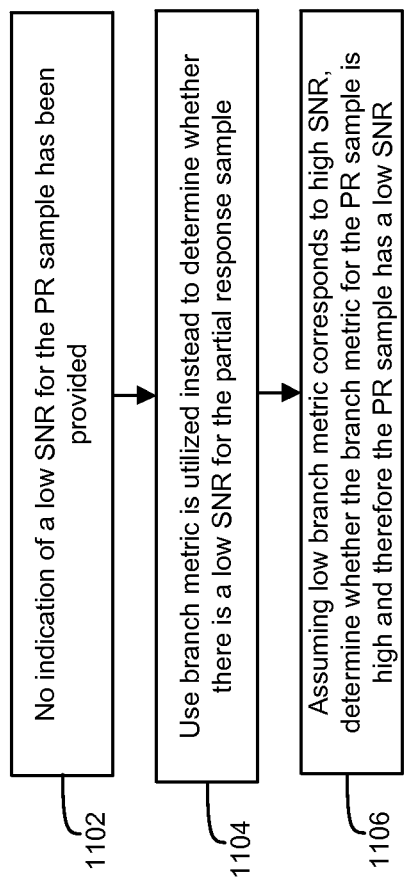
FIG. 11 is a flow chart that illustrates exemplary steps of self erasure when no indication for low SNR for a partial response sample is received, in accordance with an embodiment of the disclosure.

FIG. 11 is a flow chart that illustrates exemplary steps of self erasure when no indication for low SNR for a partial response sample is received, in accordance with an embodiment of the disclosure. Referring to FIG. 11, there is shown exemplary steps 1102-1106. The exemplary steps of FIG. 11 may be implemented in a system which uses both self erasure and external erasure. In step 1102, no indication of a low SNR for the partial response sample has been provided. In step 1104, the branch metric is calculated. In step 1106, assuming a low branch metric corresponds to a high SNR, it is determined whether the branch metric for the partial response sample is high and therefore the partial response sample has a low SNR. If the sample does not have low SNR, then the sequence estimation process may proceed based on the calculated branch metric. If the sample has low SNR, then steps similar to steps 1008-1014 may be performed.

Figure 12:
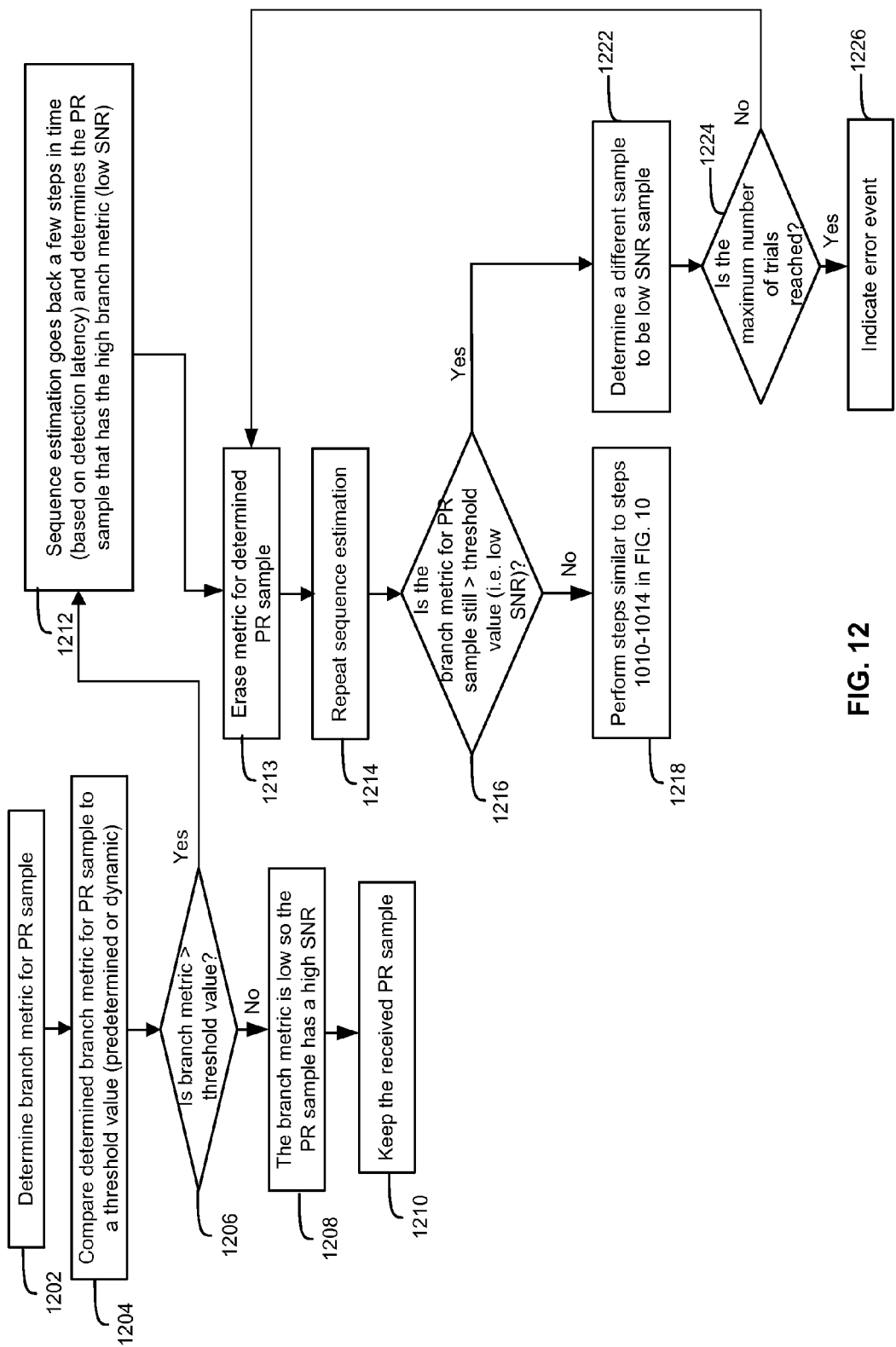
FIG. 12 is a flow chart that illustrates exemplary steps for self erasure, in accordance with an embodiment of the disclosure.

FIG. 12 is a flow chart that illustrates exemplary steps for self erasure, in accordance with an embodiment of the disclosure. Referring to FIG. 12, there is shown exemplary steps 1202-1226. In step 1202, a branch metric may be determined for a received partial response sample. The determined branch metric may be, for example, an accumulation or integration, over the length of the sequence estimation, of the best (e.g., lowest) of a plurality of generated branch metrics. Each of the plurality of branch metrics may correspond to an error between the value of the received sample and one of the possible values of the corresponding transmitted sample (i.e., the values of the constellation used by the transmitter). In step 1204, the determined branch metric for the partial response sample may be compared to a threshold value. In accordance with various embodiments of the disclosure, the threshold value may be a predetermined value or a dynamically determined value. In step 1206, it may be determined whether the determined branch metric is greater than the threshold. If in step 1206, it is determined that the branch metric is not greater than the threshold value, then in step 1208, it is determined, based on the low branch metric, that the received partial response sample has a high SNR. In step 1210, the received partial response sample is kept (i.e., the metric may be used for symbol survivor selection).

If in step 1206, it is determined that the branch metric is greater than the threshold value, then in step 1212, the sequence estimation may go back a few steps in time (based on detection latency) and determines the PR sample that has the high branch metric (low SNR). In other words, the sequence estimation circuit attempts to determine which sample is the low SNR sample that led to the metric rising above the determined threshold. Since the metric may be accumulated or integrated over the memory depth of the sequence estimation process, and because some headroom is needed between a typical value of the branch metric and the determined threshold to allow for noise, the branch metric may not exceed the determined threshold until one or more sample times after the sample time at which the low SNR sample was processed. The determination in step 1212 may, for example, be based on the slope of the branch metric, where a steep positive slope (or big jump in metric value over a small span of sample times) may be associated with a low SNR sample. How many sample times backward the sequence estimation circuit 112 may search for the low SNR sample may be limited by the memory depth of the sequence estimation process.

In step 1213, the sequence estimation circuit erases (e.g, forces to zero) the metric corresponding to the sample determined in step 1212. In step 1214, the sequence estimation may be repeated. In step 1216, it may be determined whether the branch metric for the partial response sample is still greater than the threshold value. That is, whether the correct sample was determined in step 1212.

If, in step 1216, it is determined that the branch metric for the partial response sample is not greater than the threshold value, then in step 1218, steps similar to those in steps 1010-1014 of FIG. 10 may be performed. If, in step 1216, it is determined that the branch metric for the partial response sample is still greater than the threshold value, then in step 1222, the sequence estimation process determines a different sample to be the low SNR sample. For example, the different sample may comprise a sample that may be adjacent to the sample used in the most-recent execution of step 1214. Non adjacent samples may be utilized as well. Also in step 1222, the metric corresponding to the sample used in the most-recent execution of step 1214 may be restored to its non-zero value.

In step 1224, it is determined whether the maximum number of trials has been reached. If in step 1224, it is determined that the maximum number of trials has not been reached, then the exemplary steps proceed to step 1213. If in step 1224, it is determined that the maximum number of trials has been reached, then the exemplary steps proceed to step 1226, where an error event is indicated.

Although FIG. 12 illustrates the use of a single branch metric for the partial response sample, the disclosure is not limited in this regard. Accordingly, one or more branch metrics for the partial response sample may be utilized without departing from the spirit and scope of the disclosure. The process described in FIG. 12 may be repeated for every incoming PR sample.

Although various aspects of this disclosure are described with reference to an embodiment in which estimation is performed on symbols, such aspects may be equally applicable to an embodiment in which estimation is performed directly on information bits.

Figure 13:
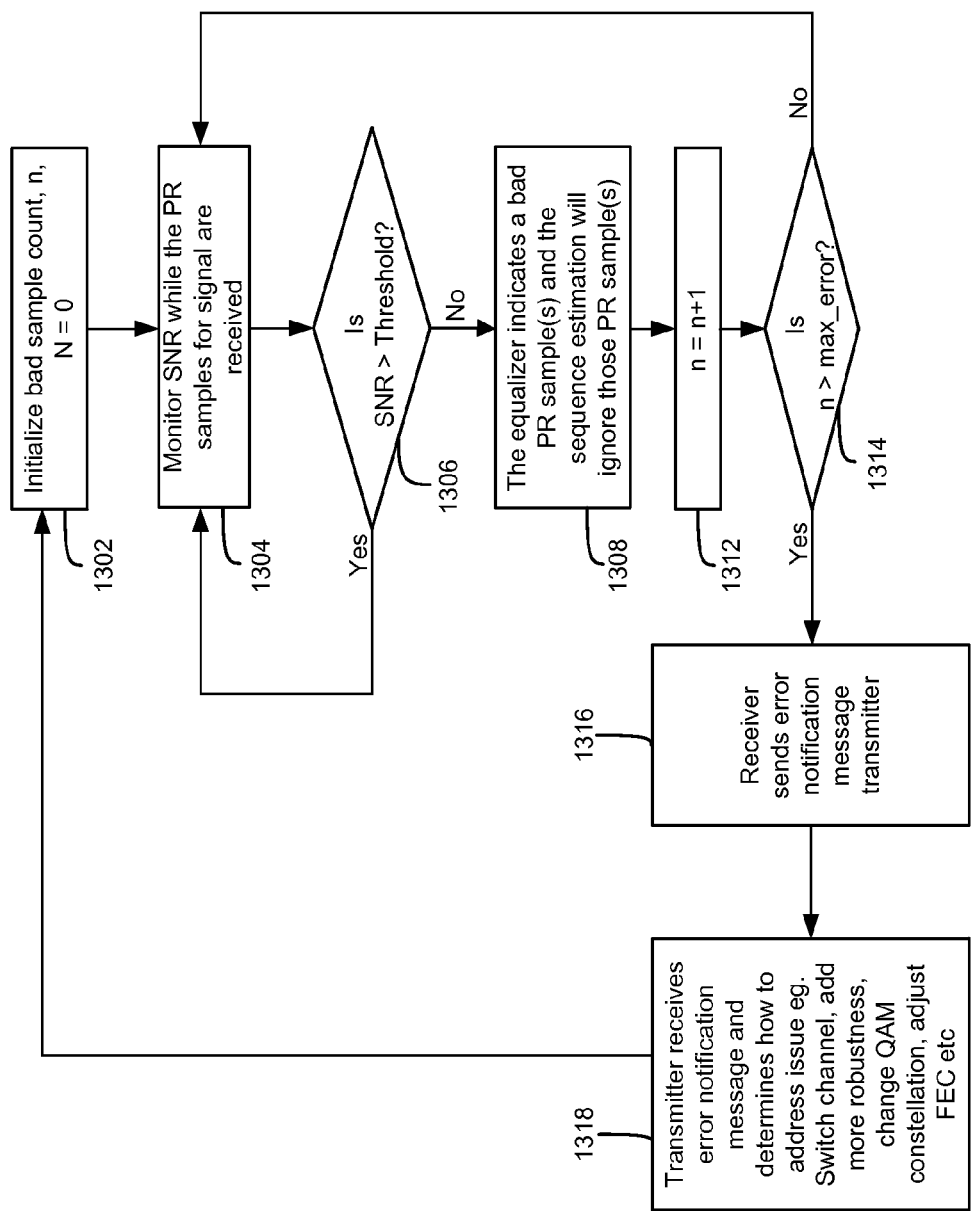
FIG. 13 is a flow chart that illustrates an exemplary erasure protocol, in accordance with an embodiment of the disclosure.

FIG. 13 is a flow chart that illustrates an exemplary erasure protocol, in accordance with an embodiment of the disclosure. Referring to FIG. 14, there is shown exemplary steps 1302 through 1318. In step 1302, a bad sample count, n, may be initialized to, for example, zero. In step 1304, the SNR is monitored while the PR samples for the signal are received.

In step 1306, a determination is made as to whether the SNR is greater than a threshold value. If in step 1306, it is determined that the SNR is greater than the threshold value, then the exemplary steps proceed to step 1304, where the SNR is monitored while the PR samples for the signal are received. If in step 1306, it is determined that the SNR is not greater than the threshold value, then in step 1308, the equalizer may indicate one or more bad PR samples and the sequence estimation process will ignore those one or more PR samples.

In step 1312, the bad sample count n, is incremented. In step 1314, a determination is made as to whether the bad sample count, n, is greater than a maximum permissible error count, namely max_error. If in step 1314 it is determined that the bad sample count, n, is greater than the maximum permissible error count, namely max_error, then in step 1316, the receiver 150 is operable to send an error notification message to the transmitter 150. In this regard, the processor 157 may be operable to control the receiver 160 in order to send the error notification message to the transmitter 150. In an exemplary embodiment of the disclosure, the error notification message may be communicated via an in-band communication channel or an out-of-band communication channel between the transmitter or modulator 150 and the receiver or demodulator 160. In some embodiments of the disclosure, the error notification may be communicated over an existing communication channel to conserve bandwidth.

In step 1318, the transmitter 150 may receive the error notification message and determine how to address the issue. In this regard, the processor 147 may be operable to handle the received error notification message and determine how to address the issue. The processor 147 may handle the issue by, for example, switching channel, adding more robustness by utilizing a more robust communication protocol, changing the QAM constellation, adjusting FEC, increasing transmitted power, update spreading (interleaving) configuration and so on. Subsequent to step 1318, the exemplary steps may proceed to step 1302, where the bad sample count, n, may be initialized.

In various embodiments of the disclosure, an inter-symbol correlated signal is received by a demodulator such as the demodulator 860. During sequence estimation when demodulating the received an inter-symbol correlated signal, the received ISC signal may be processed utilizing an erasure mechanism. The received ISC signal may comprise partial response samples. The partial response samples may be spread by the interleaver 145. In this regard, the interleaver 145 may be operable to spread the partial response samples over time. Results corresponding to the erasure mechanism may be fed back to a modulator, such as the modulator 850, which transmitted the inter-symbol correlated signal. The modulator 850 may adjust operation of one or more of its functions and/or components based on the feedback results. It may be determined whether to utilize self erasure or external erasure for the processing of the spread partial response samples. In this regard, the determining may be based on whether or not events of low SNR for corresponding ones of the partial response samples are identified, and/or when user configuration for concurrent operation of self erasure and external erasure occurs.

The external erasure is utilized for processing the corresponding ones of the partial response samples when the events of low SNR are identified externally. The self erasure may be utilized for processing the corresponding ones of the partial response samples when the events of low SNR are not identified. In this regard, the self the may be based on one or more branch metrics of the corresponding ones of said partial response samples.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within the transmitter 150 and/or receiver 160 may be configured or reconfigured based on, for example, current, recently received and/or updated signals, information and/or data.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for corrupt symbol handling for providing high reliability sequences.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
    in a receiver:
        receiving a sample of a signal;
        determining, prior to calculating any branch metric values for said sample, whether low-signal-to-noise ratio events for said sample of said signal are detectable for said sample;
        in instances that low-signal-to-noise ratio events for said signal are detectable prior to calculating any branch metric values for said sample, configuring said receiver to use external erasure for demodulating said sample;
        in instances that low-signal-to-noise ratio events for said signal are not detectable for said sample prior to calculating any branch metric values for said sample, configuring said receiver to use self erasure for demodulating said sample; and
        demodulating said sample.

2. The method of claim 1, wherein, when said receiver is configured to use external erasure, said demodulating said sample comprises:
    determining, prior to calculating any branch metric values for said sample, a signal-to-noise ratio of said sample;
    in instances that said signal-to-noise ratio of said sample is above a threshold, calculating a branch metric value for said sample based on said sample;
    in instances that said signal-to-noise ratio of said sample is below said threshold, setting said branch metric value for said sample to a predetermined value.

3. The method of claim 2, wherein said predetermined value is zero.

4. The method of claim 2, wherein, in said instances that said signal-to-noise ratio of said sample is below said threshold, said demodulating comprises determining whether to generate an indication of an error event based on signal-to-noise ratio of each of one or more other samples of said signal.

5. The method of claim 2, wherein, in said instances that said signal-to-noise ratio of said sample is below said threshold, said demodulating comprises determining whether to generate an indication of an error event based on signal-to-noise ratio of each of one or more other samples of said signal.

6. A system comprising:
    a receiver comprising an erasure circuit, wherein said receiver is operable to:
        receive a plurality of samples of a signal;
        demodulate a first one or more of said samples using said erasure circuit configured for external erasure; and
        demodulate a second one or more of said samples using said erasure circuit configured for self erasure, wherein, when said erasure circuit is configured for external erasure, demodulation of said first one or more of said samples by said receiver comprises:
            determination of a signal-to-noise ratio of said first one or more of said samples prior to calculating any branch metric values for said first one or more of said samples;
            in instances that said signal-to-noise ratio of said first one or more of said samples is above a threshold, calculation of a branch metric value for said first one or more of said samples based on said first one or more of said samples;
            in instances that said signal-to-noise ratio of said first one or more of said samples is below said threshold, setting of said branch metric value for said first one or more of said samples to a predetermined value.

7. The system of claim 6, wherein, in said instances that said signal-to-noise ratio of said first one or more of said samples is below said threshold, said demodulation of said first one or more of said samples comprises a determination of whether to generate an indication of an error event based on a signal-to-noise ratio of each of one or more other samples of said signal.

8. A system comprising:
a receiver comprising an erasure circuit, wherein said receiver is operable to:
  receive a plurality of samples of a signal;
  demodulate a first one or more of said samples using said erasure circuit configured for external erasure; and
  demodulate a second one or more of said samples using said erasure circuit configured for self erasure, wherein, when said erasure circuit is configured for self erasure, demodulation of a second one or more of said samples by said receiver comprises:
    calculation of a branch metric value for said second one or more of said samples based on said second one or more of said samples;
    determination of a signal-to-noise ratio for said second one or more of said samples based on said calculated branch metric value for said second one or more of said samples;
    in instances that said signal-to-noise ratio is above a threshold, use of said calculated branch metric value for survivor selection; and
    in instances that said signal-to-noise ratio is below said threshold, discarding of said branch metric value.

9. The system of claim 8, wherein, in said instances that said signal-to-noise ratio is below said threshold, said demodulation of said second one or more of said samples comprises a determination of whether to generate an indication of an error event based on signal-to-noise ratio of each of one or more other samples of said signal.

10. A system, comprising:
a receiver comprising erasure circuitry and sequence estimation circuitry, wherein said receiver is operable to:
  receive a sample of a signal;
  determine, prior to any calculation of branch metric values for said sample by said sequence estimation circuitry, whether low-signal-to-noise ratio events for said sample of said signal are detectable for said sample;
  in instances that low-signal-to-noise ratio events for said signal are detectable prior to calculation of any branch metric values for said sample, configure said erasure circuitry to use external erasure for demodulation of said sample;
  in instances that low-signal-to-noise ratio events for said signal are not detectable for said sample prior to any calculation of branch metric values for said sample, configure said erasure circuitry to use self erasure for demodulation of said sample; and
  demodulate said sample.

11. The system of claim 10, wherein, when said erasure circuitry is configured to use external erasure:
said receiver is operable to determine, prior to any calculation of branch metric values for said sample by said sequence estimation circuitry, a signal-to-noise ratio of said sample; and
said sequence estimation circuitry is operable to:
  in instances that said signal-to-noise ratio of said sample is above a threshold, calculate a branch metric value for said sample based on said sample; and
  in instances that said signal-to-noise ratio of said sample is below said threshold, set said branch metric value for said sample to a predetermined value.

12. The system of claim 11, wherein said predetermined value is zero.

13. The system of claim 11, wherein, in said instances that said signal-to-noise ratio of said sample is below said threshold, said receiver is operable to determine whether to generate an indication of an error event based on a signal-to-noise ratio of each of one or more other samples of said signal.

14. The system of claim 10, wherein said receiver comprises an equalization circuit and said determination of whether low-signal-to-noise ratio events for said sample of said signal are detectable for said sample is based on whether said equalizer can detect said low-signal-to-noise ratio events for said sample.

* * * * *